US008626349B2

(12) United States Patent
Stanczak et al.

(10) Patent No.: US 8,626,349 B2
(45) Date of Patent: Jan. 7, 2014

(54) METHOD, A SYSTEM, A COMPUTER-READABLE MEDIUM, AND A POWER CONTROLLING APPARATUS FOR APPLYING AND DISTRIBUTING POWER

(75) Inventors: Mark Stanley Stanczak, Sterling Heights, MI (US); Louis Stephen Smutek, Livonia, MI (US); Alan Wayne Brown, Canton, MI (US); David Allen Backus, Milford, MI (US)

(73) Assignee: Global Embedded Technologies, Inc., Farmington Hills, MI (US)

( * ) Notice: Subject to any disclaimer, the term of this patent is extended or adjusted under 35 U.S.C. 154(b) by 0 days.

(21) Appl. No.: 13/374,375

(22) Filed: Dec. 23, 2011

(65) Prior Publication Data

US 2012/0283889 A1 Nov. 8, 2012

Related U.S. Application Data

(62) Division of application No. 12/072,688, filed on Feb. 27, 2008, now Pat. No. 8,086,355.

(60) Provisional application No. 60/903,914, filed on Feb. 28, 2007.

(51) Int. Cl.
| | | |
|---|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *H02M 3/335* | (2006.01) |
| *G05F 1/00* | (2006.01) |

(52) U.S. Cl.
USPC ........ 700/286; 700/291; 700/297; 363/21.11; 363/21.18; 323/282; 323/283

(58) Field of Classification Search
USPC ............ 700/286, 291, 297; 363/21.11, 21.18; 323/282–283
See application file for complete search history.

(56) References Cited

U.S. PATENT DOCUMENTS

| | | | | |
|---|---|---|---|---|
| 5,229,651 A | * | 7/1993 | Baxter et al. | 307/66 |
| 5,265,035 A | * | 11/1993 | Reifman et al. | 702/185 |
| 5,550,476 A | * | 8/1996 | Lau et al. | 324/522 |
| 5,680,299 A | | 10/1997 | Yasuda et al. | |
| 5,719,787 A | * | 2/1998 | Chiang et al. | 700/293 |
| 6,002,260 A | * | 12/1999 | Lau et al. | 324/522 |
| 6,049,741 A | * | 4/2000 | Kawamura | 700/80 |
| 6,266,620 B1 | | 7/2001 | Baeten et al. | |
| 6,343,236 B1 | * | 1/2002 | Gibson et al. | 700/79 |
| 6,560,130 B2 | | 5/2003 | Oba et al. | |
| 6,654,351 B1 | | 11/2003 | Casey | |

(Continued)

OTHER PUBLICATIONS

U.S. Appl. No. 60/903,914, Stanczak et al.

(Continued)

*Primary Examiner* — Ronald Hartman, Jr.
(74) *Attorney, Agent, or Firm* — Kokka & Backus, PC

(57) ABSTRACT

Embodiments of the invention relate generally to power management and the like, and more particularly, to an apparatus, a system, a method, and a computer-readable medium for providing power controlling functionality to generate configurable power signals and to deliver power during fault conditions. In at least some embodiments, a power control unit can generate power signals having configurable attributes as a function of a mode of operation, a fault type, and the like.

20 Claims, 23 Drawing Sheets

(56) References Cited

U.S. PATENT DOCUMENTS

| | | | |
|---|---|---|---|
| 6,700,795 B1 | 3/2004 | Jones et al. | |
| 6,816,757 B1* | 11/2004 | De La Ree et al. | 700/286 |
| 6,868,311 B2* | 3/2005 | Chiang et al. | 700/293 |
| 6,907,321 B2* | 6/2005 | Kearney et al. | 700/292 |
| 7,009,372 B2 | 3/2006 | Sutardja et al. | |
| 7,046,403 B1* | 5/2006 | Yhann | 358/518 |
| 7,079,904 B1 | 7/2006 | Forstrom et al. | |
| 7,116,009 B2 | 10/2006 | Tamai et al. | |
| 7,248,976 B2* | 7/2007 | Thiveos | 702/59 |
| 7,526,405 B2* | 4/2009 | Miller | 702/179 |
| 7,609,158 B2 | 10/2009 | Banting et al. | |
| 7,881,081 B1 | 2/2011 | Tallam et al. | |
| 8,086,355 B1 | 12/2011 | Stanczak et al. | |
| 8,244,405 B2* | 8/2012 | Kao et al. | 700/286 |
| 8,336,352 B2* | 12/2012 | Abiprojo et al. | 72/69 |
| 2004/0145323 A1 | 7/2004 | Maslov et al. | |
| 2006/0229829 A1* | 10/2006 | Thiveos | 702/59 |
| 2007/0102408 A1 | 5/2007 | Peters | |
| 2007/0257647 A1 | 11/2007 | Chen et al. | |
| 2008/0234871 A1* | 9/2008 | Yamada et al. | 700/286 |
| 2009/0309567 A1 | 12/2009 | Morroni et al. | |
| 2010/0152910 A1* | 6/2010 | Taft | 700/286 |

OTHER PUBLICATIONS

U.S. Appl. No. 13/374,377, Stanczak et al.
U.S. Appl. No. 13/374,374, Stanczak et al.
PowerPulse, Darnell Group, Inc., *Power-One and IR Enter Into Patent License Agreement*; Retrieved from the Internet on Aug. 8, 2012: URL: http://www.powerpulse.net/story.php?storyID=25959.

* cited by examiner

METHOD, A SYSTEM, A COMPUTER-READABLE MEDIUM, AND A POWER CONTROLLING APPARATUS FOR APPLYING AND DISTRIBUTING POWER

CROSS REFERENCE TO RELATED APPLICATIONS

This application is a divisional of U.S. Nonprovisional Patent Application Ser. No. 12/072,688 (now U.S. Pat. No. 8,086,355), filed Feb. 27, 2008, which claims priority to U.S. Provisional Patent Application No. 60/903,914, entitled "Computer-Readable Medium, a Method, a System, and a Power Switching Apparatus for Applying and Distributing Power," filed on Feb. 28, 2007 with all of which are hereby incorporated by reference. This application is also related to U.S. Nonprovisional Patent Application Ser. No. 13/374,377, having and filed concurrently herewith, and to U.S. Nonprovisional Patent Application Ser. No. 13/374,374, having and filed concurrently herewith.

This invention may have been made with government support under contract number W56HZV-04-C-0132 awarded by the United States Army. The government may have certain rights in the invention.

BRIEF DESCRIPTION

Embodiments of the invention relate generally to power management and the like, and more particularly, to an apparatus, a system, a method, and a computer-readable medium for providing power controlling functionality to generate configurable power signals and to deliver power during fault conditions.

BACKGROUND

Traditional techniques for providing power switching functionality to generate configurable power signals and to deliver power during fault conditions, while functional, do not readily facilitate the effective power distribution, especially in vehicles. Further, conventional power switching devices generally are not well suited to provide for safety mechanisms (e.g., resolving extreme short circuit conditions).

It would be desirable to provide computer-readable media, methods, systems and power controlling apparatuses for reducing the drawbacks commonly associated with provisioning power, and to further provide techniques, for example, to do so during various fault conditions.

SUMMARY

A computer-readable medium, a method, a system and a power controlling apparatus are disclosed to, among other things, apply and distribute power in vehicles. According to the various embodiments, a power-controlling apparatus can be configured to control power to an entity consuming power or from an entity producing power as a function of time, sensed parameter, or type of fault. Thus, a power-controlling apparatus can operate as a "power router" to distribute power among a network of power sources and loads, and to redistribute power depending on a mode of operation and/or a fault condition. In one embodiment, a Power Control Unit ("PCU") is configured to operate as a "power router." In some examples, a power control unit can deliver at least 250 Amps (e.g., continuously) in one channel operation, and in two channel operation, at least 125 Amps per channel. In some embodiments, the PCU can operate, for example, from 5 Volts to 55 Volts. In various embodiments, the PCU can implement one or more of the following: configurable (e.g., over network like CAN) short circuit detection, configurable subtle over current detection, configurable extreme over voltage/under voltage detection, configurable, subtle over voltage/under voltage detection, configurable extreme over temperature, configurable subtle over temperature detection, configurable Pulse Width Modulation (PWM)-based waveforms, configurable PWM ramp-up/ramp-down of signals, configurable PWM continuous (or nearly so) waveform generation, programmability over a network (such as CAN), reporting of Voltage, Current, Temperature, and the like over a communication network, a network status detection for both network dependent operating modes and robust stand-alone operation. For example, a PCU can distinguish an over current condition from allowed high current conditions through an advanced and configurable fault maturing algorithm, according to one embodiment. In another embodiment, the PCU can respond to over current, over voltage, and under voltage conditions within, for example, 4 milliseconds. In another embodiment, a PCU can be used to control the power contribution from various power sources and/or various energy storage devices that collectively or individually can supply power to a power bus.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1A:
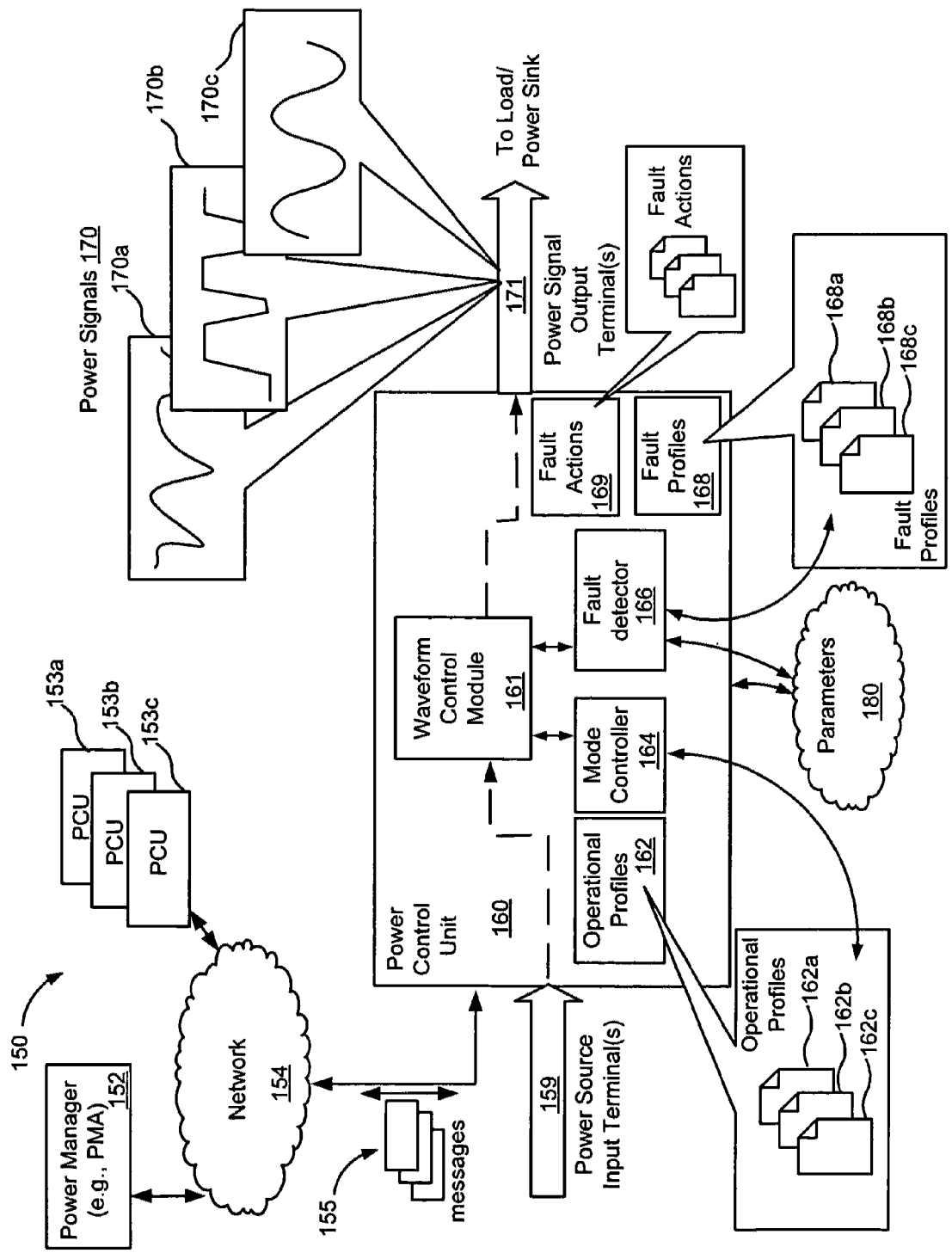
FIG. 1A is an example of a power control unit in accordance with at least some embodiments of the present invention.

FIG. 1A is an example of a power control unit in accordance with at least some embodiments of the present invention. As shown in diagram 150, a power control unit 160 includes a waveform control module 161, one or more operational profiles 162, a mode controller 164, a fault detector 166, and one or more fault profiles 168. Also, power control unit 160 can include one or more power source input terminals 159 and one or more power signal output terminals 171. At least one power source input terminal 159 can be configured to receive power from any number of power sources, such as solar cell arrays, batteries, alternators, and the like, and in different forms (e.g., in either DC or AC at various amplitudes). At least one power signal output terminal 171 can be configured to transmit power signals to any number of power sinks, including loads, such as motors, lights, resistive loads (e.g., heaters), batteries, and the like, and in different forms (e.g., in either DC or AC at various amplitudes and/or at various rates of change). Power control unit 160 is configured to control a power signal in accordance with a mode of operation and/or a fault condition, and to transmit the power signal to a power sink (e.g., a load).

In view of the foregoing, power control unit 160 can generate various power signals with programmable power signal waveforms, the power signals being configured to apply shaped waveforms that have relatively high voltage amplitudes (e.g., up to 55 volts, or greater) and/or relatively high current magnitudes (e.g., up to 100 amperes, or greater). As such, power control unit 160 can facilitate power distribution from any number of power sources (not shown) to a power sink (not shown) that can operate at relatively high voltage amplitudes and/or high current magnitudes. In at least some embodiments, power control unit 160 can modify power signals based on a mode of operation for either power control unit 160 or the system of which power control unit 160 is a part. In at least some embodiments, power control unit 160 can modify power signals in response to detecting a fault condition, as well as the type of fault that is detected. Further, power control unit 160 can undertake a corrective action to resolve or accommodate a pending fault to ensure operation of either the power sink or a system containing power control unit 160, or both. For example, power control unit 160 can discriminate between absolute faults (i.e., extreme faults) for a parameter that exceeds a range or threshold that demarcates the boundary of acceptable operation, and nascent faults that mature into a matured fault (i.e., subtle faults) after an interval of time. Absolute faults (i.e., extreme faults) are magnitude-based faults as they predominantly are determined in relation to magnitudes of a parameter, according to some embodiments, whereas nascent faults (i.e., subtle faults) are time-based faults as they predominantly are determined in relation to an amount of time that a parameter is, for example, outside a range of acceptable parameter values during acceptable modes of operation.

Figure 11:
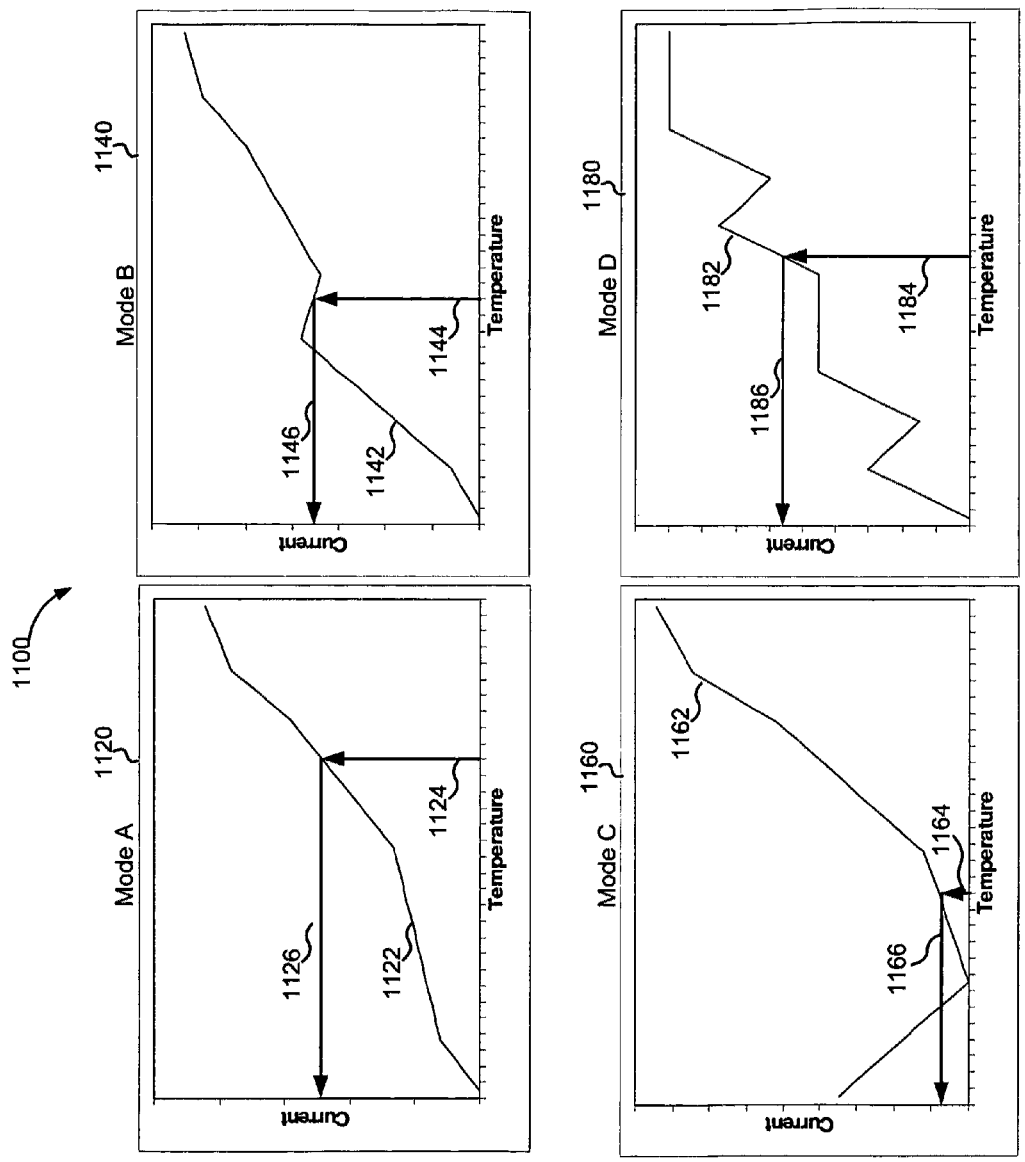
FIG. 11 depicts an example of a set of operational profiles for controlling operation of a power control unit, according to at least some embodiments.

In operation, mode controller 164 is configured to determine one mode of operation from a subset of modes of operation. A mode of operation can be associated with an operational profile from operational profiles 162, where the operational profile can include data that describe how power control unit 160 operates to generate a power signal responsive to a parameter from parameters 180. An operational profile can include relationships between a parameter and a power signal as an output, including transfer functions and other mathematically-described relationships between one or more inputs (i.e., parameters) and an output (i.e., the power signal). To illustrate, consider that power control unit 160 is used in a combat vehicle to operate a fan motor in a combat mode (i.e., fan is to operate to cool, regardless of speed or power to ensure success in combat), in a power conversation mode (i.e., fan is to operate to cool, but at a reduced speed to conserve power), and a silent mode (i.e., fan is to operate to cool, but at a speed to minimize vibrations and/or audible sounds at resonant frequencies). Combat mode can be associated with operational profile 162a, power conversation mode can be associated with operational profile 162b, and silent mode can be associated with operational profile 162c. Examples of operational profiles for various modes of operation are depicted in FIG. 11. Further, operational profiles 162 can include data representing one or more levels of performance, for each mode of operation, for a power sink. So, if the power sink/load is operating out-of-spec (e.g., as determined by a parameter), then power control unit 160 can generate a power signal to meet a level of performance, even if it abnormally stresses the load. For example, if sand or grit impairs the speed of fan, level of performance might require that fan operate a certain RPM, regardless of the power required to meet the speed.

Referring back to FIG. 1A, mode controller 164 can be configured to select operational profiles 162a, 162b, and 162c, based on the mode of operation, to respectively generate, for example, power signal 170a, 170b, and 170c at one or more power signal output terminals 171. Thus, power control unit 160 can apply power to a device, which can be a load or a power sink, by selecting an operational profile 162 to deliver power to the device. Power control unit 160 can generate a power signal 170 having a waveform shaped (e.g., by waveform control module 161) as a function of a selected operational profile. Power control unit 160 then transmits power signal 170 to the device, which can be a power sink or a load. Note that the terms "power sink" and "load" can refer to any device that operates to consume power, such as a power-consumption device that performs work and an energy storage device (e.g., batteries). In some cases, the device can be a power source rather than a power sink or load. For example, a battery both sources power and sinks current during recharging.

Waveform control module 161 can generate a power signal by, for example, shaping a portion of a waveform for one of power signals 170 to have a rate of change specified by one of operational profiles 162. The rate of change can describe a slope for portions of either a trailing edge or a leading edge of a portion of the power signal, according to some embodiments. Waveform control module 161 can also form another portion of the waveform for one of power signals 170 to include an amplitude (i.e., a magnitude) specified by one of operational profiles 162. In some embodiments, waveform control module 161 can include a power-on portion of a waveform for one of power signals 170 and a power-off portion of the waveform. A power-on portion and a power-off portion of a waveform for power signal 170 can reduce or eliminate transients associated with applying power or removing power from a load. In one example, the power-on portion provides for a soft start of a load (e.g., a motor), whereas the power-off portion provides for a soft stop of the load. In at least some embodiments, the term "power-on portion" can refer to a portion of a waveform that transitions at any rate of change from one level of any amount (e.g., a lower value) to another level of any amount (e.g., a higher value) at the beginning of the waveform or waveform cycle (e.g., during a positive rate of change). The term "power-off portion" can refer to a portion of a waveform that transitions at some rate of change from one level of any amount (e.g., a higher value) to another level of any amount (e.g., a lower value) at the end of waveform or waveform cycle (e.g., during a negative rate of change).

In at least some embodiments, fault detector 166 is configured to determine whether a fault condition exists, and, if so, which type of fault relates to the fault condition. Fault detector 166 can be configured to operate in accordance with one or more fault profiles 168. According to one embodiment, each of fault profiles 168 can include data representing parameter levels, thresholds and ranges that can demarcate a threshold or ranges of values for one or more parameters associated with normal operation. Examples of a fault profile are discussed in FIGS. 9A and 9B. Referring back to FIG. 1A, a fault profile 168 can correspond to an operation profile 162. Thus, operating a load in various modes of operation may cause power control unit 160 to produce various power signal magnitudes and waveforms and to operate in response to different values of parameters. Correspondingly, different fault profiles can be used to determine faults and fault types for different values of parameters in different modes of operation. Upon detecting a fault, fault detector 166 can initiate a fault action from fault actions 169, which include data representing a set of actions that can be undertaken to either resolve a fault condition (e.g., shut down operation of a load, increase operation of a load, such as a fan when temperature rises above a threshold), or compensate for the fault condition (e.g., if a battery is losing charge without be recharged by an alternator, then power control unit 160 can operate to meter the application of power to a load to conserve power).

In at least some embodiments, power control unit 160 can control the application of power during fault conditions. Waveform control module 161 can be configured to generate a power signal for delivery to a power sink, the power signal having a programmable waveform that has a shape based on a selected operational profile. Fault detector 166 can monitor a parameter 180 associated with to determine whether the parameter is within a range of parameter values associated with normal operation of the power sink, or in the normal operation ranges associated with other power sinks. In various instances, parameter 180 can be associated with the power signal (e.g., voltage, current), the power sink (e.g., the load's temperature), or any other parameter (e.g., ambient temperature). When fault detector 166 detects a fault as a function of a value for the parameter being noncompliant (i.e., being outside the range of the parameter values or above/below a threshold associated with normal operation), fault detector 166 initiates a fault action 169.

In some embodiments, fault detector 166 is configured to compare one of parameters 180 against one or more fault profiles 168. Based on the comparison, fault detector 166 can be configured to classify a fault once detect. For example, fault detector 166 can classify the fault as being associated with a first subset of faults if the parameter matches at least a portion of fault profile 168a, as an example. Or, fault detector 166 can classify the fault as being associated with a second subset of faults if the parameter matches a second fault profile of the one or more fault profiles. In a specific embodiment, the first subset of faults include nascent faults that mature into a fault after some time (e.g., a subtle fault), whereas the second subset of faults can include extreme faults (or absolute faults), which are predominately determined based on relative magnitudes of a parameter. In other embodiments, there can be any number of subset of faults with which to classify faults (e.g., two or more subsets).

Figure 9A:
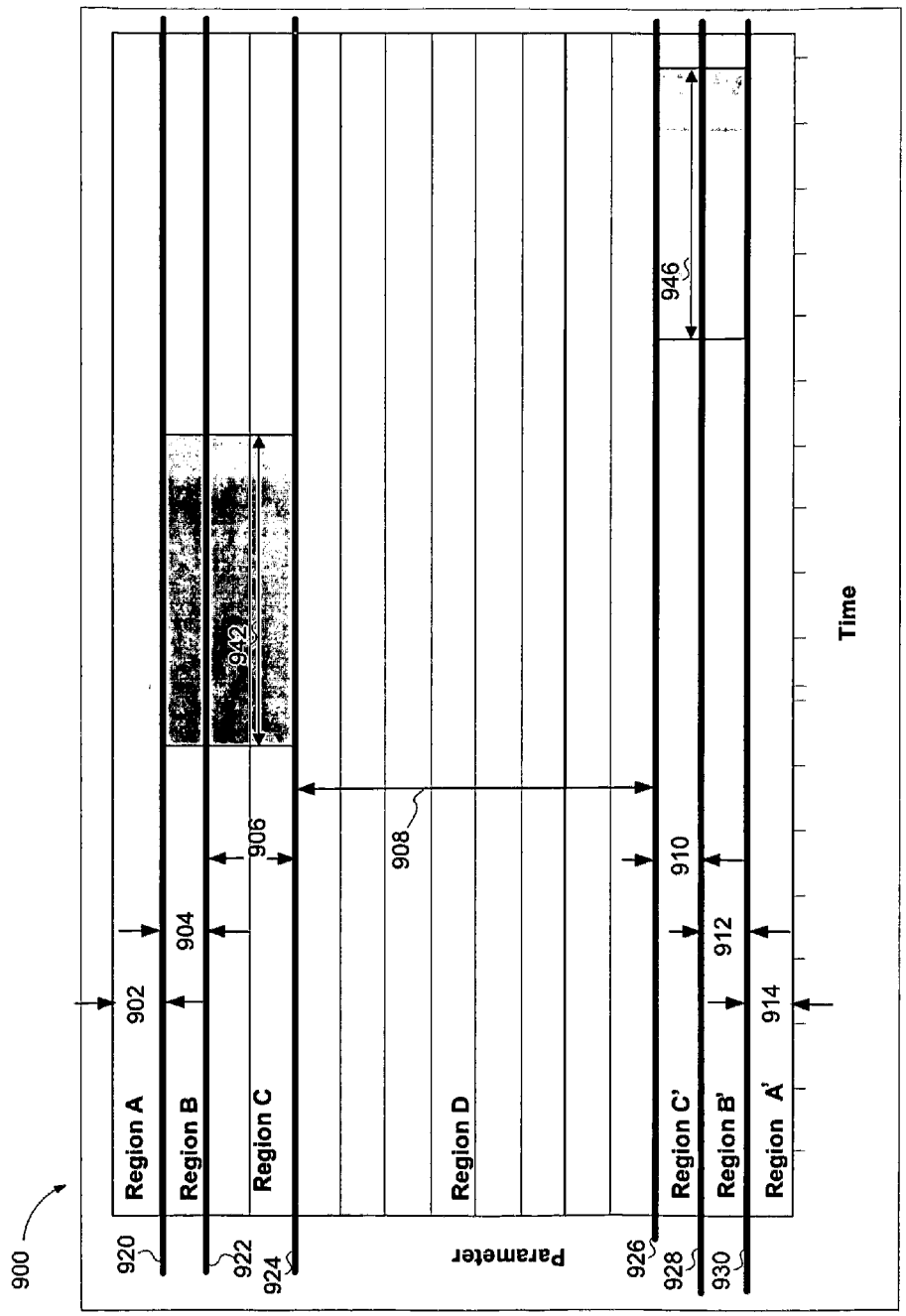
FIGS. 9A and 9B are diagrams showing various fault profiles to determine types of faults, according to various embodiments of the invention.
Figure 9B:
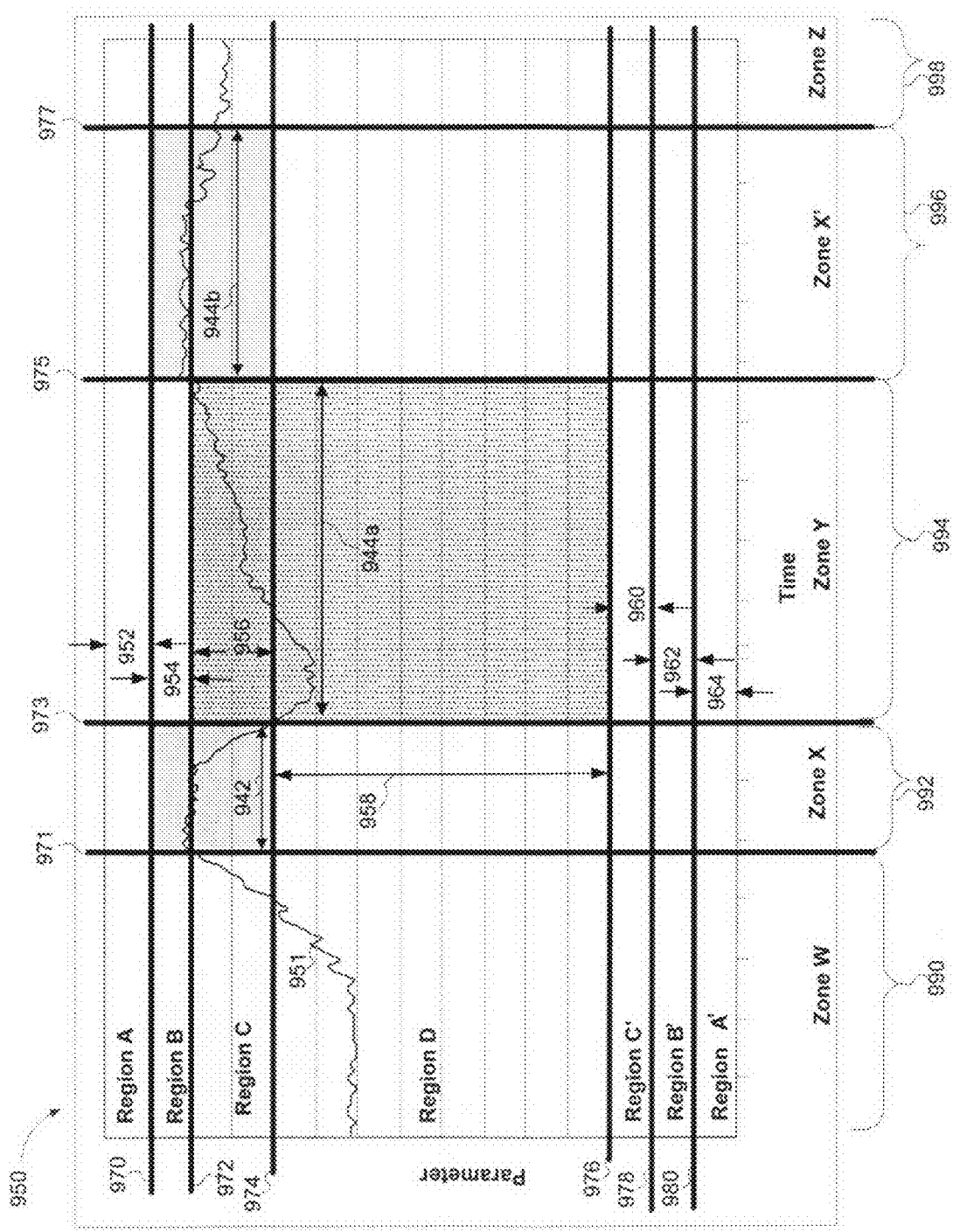

Fault detector 166 classifies a fault as being associated with the first subset of faults by confirming whether the fault is mature. For example, a determination that a fault is mature can include determining that the value for the parameter is associated with a first subset of parameter values, and monitoring an interval of time during which the value for the parameter is associated with the first subset of parameter values. In at least one embodiment, the first subset of parameter can include parameter values associated with a hysteresis region and a subtle fault region, such as shown in FIGS. 9A and 9B. Once the interval of time exceeds a matured fault threshold, then the fault is deemed to be a matured fault (e.g., a matured subtle fault). Optionally, fault detector 166 can generate an indication that the fault is mature, and thus, is a matured fault, with a fault action subsequently implemented. Such a fault action would be related to faults in the first subset of faults. But note that if fault detector 166 does not detect that the interval of time exceeds the matured fault threshold, then the fault has yet to mature. According to some embodiments, fault detector 166 can identify that the fault is nascent (e.g., a subtle fault trigger level has been surpassed), and classify the fault as a nascent fault. Fault detector 166 then can determine whether the fault is maturing or dematuring. For example, fault detector 166 can increase a degree of maturity for the nascent fault when the value for the parameter remains associated with the first subset of parameter values. But fault detector 166 can decrease the degree of maturity for the nascent fault when the values of the parameter are associated with a second subset of parameter values (e.g., values for a normal operation and values associated with a hysteresis region after surpassing a trigger level bounding the normal range of operation). Note that fault detector 166 can identify the nascent fault as a mature fault when the degree of maturity meets a threshold degree of maturity (i.e., the threshold indicative of a matured fault) Lastly, fault detector 166 can classify a fault as being associated with a third subset of faults by confirming whether the fault is absolute (e.g., an extreme fault).

In various embodiments, power control unit can operate independently or in concert within a system of power control units, including power control units ("PCU") 153a to 153c. In some cases, a master controller configured to communicate messages 155 via a network 154 to the system power control units. Power control units 153a to 153c can operate similarly to power control unit 160 to generate power signals to a number of loads, the power signals having controllable waveforms that are shaped based on operational profiles. Power control units 153a to 153c and power control unit 160 can be configured to accept messages 155 from network 154 that are configured to modify the controllable waveform of one of the power signals. In one embodiment, power control units 153a to 153c and power control unit 160 can be formed into a peer-to-peer arrangement for the plurality of power control units to communication to each other via the network. As such power control unit 160 can control operation of one of power control units 153a to 153c. For example, if parameter 180 has a certain value, then in response, power control unit 160 can transmit a message 155 to cause power control unit 153b, for example, to modify its behavior. Note, too, that power control unit 160 can operate independently should network 154 go down. Network 154 can be a CAN network, any wireless network, an Ethernet network, the Internet, or any known communications network using protocols. In some embodiments, power control unit 160 can accept input to modify the waveform to form a modified waveform, the input being responsive to a user selecting an input to modify the behavior of power control unit 160.

Figure 1B:
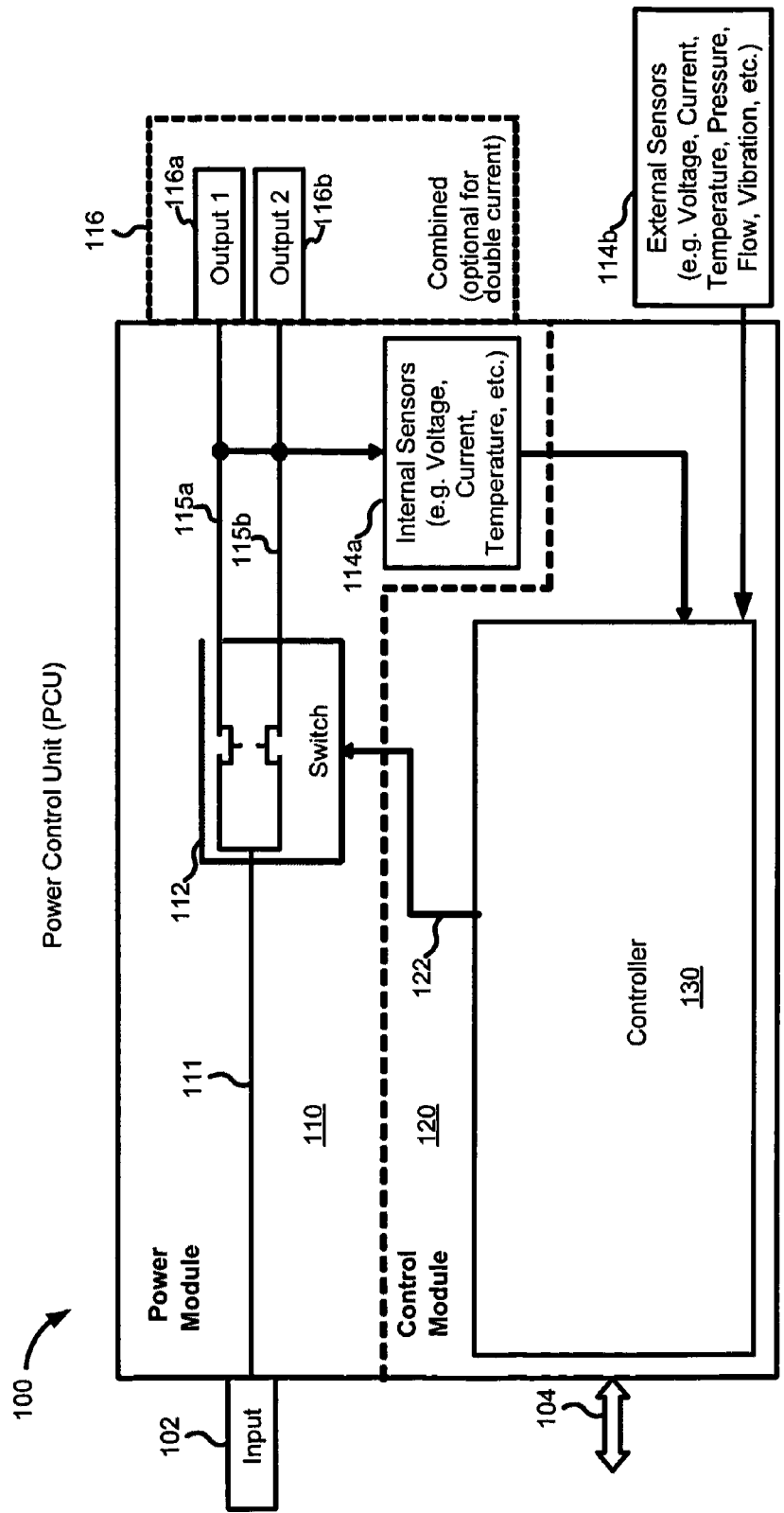
FIG. 1B is a generalized example of a power control unit in accordance with a specific embodiment of the present invention.

FIG. 1B is a generalized example of a power control unit in accordance with a specific embodiment of the present invention. Power control unit ("PCU") 100 can include a Power Module 110 and a Control Module 120. Power Module 110 can include one or more power switches 112, sensors 114 (e.g., including one or more internal sensors 114a and/or one or more external sensors 114b), and is configured to generate power signals at terminals 115a and 115b, both of which can be operationally combined to form output 116, or can control independently to generate power signals at output terminals 116a and 116b. In a specific embodiment, PCU 100 can operate in single channel mode to deliver signals to each terminal 115a and 115b, both of which can be combined to deliver power as a single terminal 116. In a specific embodiment, control module 120 is configured to control switch 112 to provide power via output terminals 116a and 116b as either single or dual independent channels. In addition, control module 120 can be configured to generate a programmable waveform for applying power. In particular, control module 120 can generate any of a number of configurable waveforms to provide, for example, various average current output levels as a function of various parameters, such as time, temperature, pressure, and the like. Further, control module 120 can be configured to determine whether a fault has matured against a variety fault thresholds at which PCU 100 performs a power controlling action.

Figure 2:
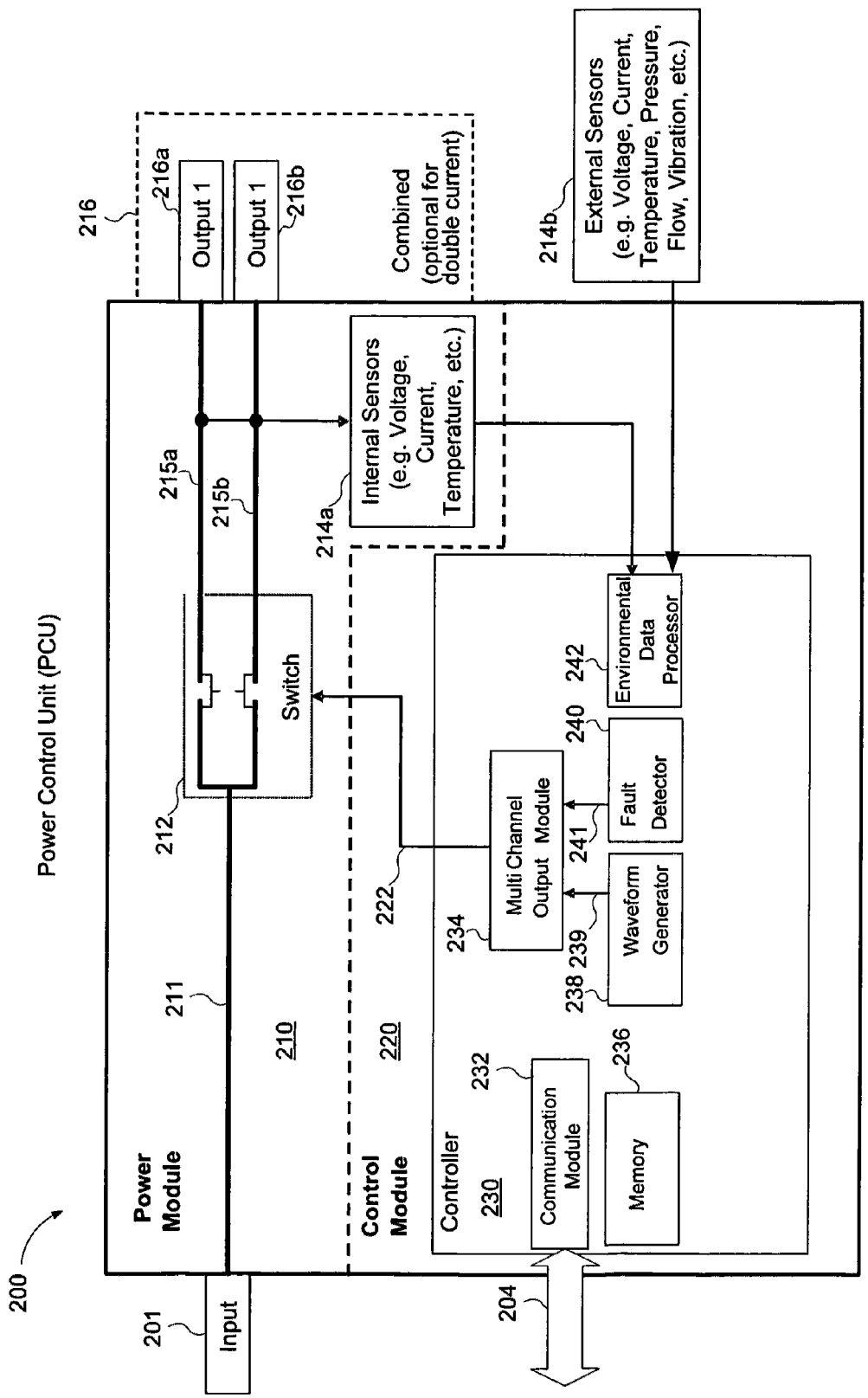
FIG. 2 is another generalized example of a power control unit implementing a specific controller in accordance with a specific embodiment of the present invention.

FIG. 2 is another generalized example of a power control unit implementing a specific controller in accordance with a specific embodiment of the present invention. PCU 200 includes a power module 210, which include elements that have structure and/or functionality as those elements described in FIG. 1B, and control module 220. Power Module 210 can be configured for a variety of, for example, voltage and current ranges and can operate, for example, in dual channel or single channel mode 216. In one embodiment, the Power Module can operate with voltages from 5V to 55V DC and/or currents to at least 50 Amps or more (e.g., in a continuous fashion) in dual channel mode, or to at least 100 Amps or more (e.g., in a continuous fashion) in single channel mode. In various embodiments, power capabilities of PCU 200 can be enhanced for improved current and voltage capabilities. For example, if switch 212 implements at least one type of solid state power switch technology, Power Module 210 can provide throughput over, for instance, 150 Amps continuous per channel in dual channel mode, or to over, for instance, 300 Amps continuous in single channel mode. In as least some embodiments, switch 212 can be fabricated using CMOS, BiCMOS, as well as any other type of semiconductor fabrication processes and material, such as silicon carbide ("SiC").

Control module 220 includes controller 230 includes one or more of the following: a Multi-Channel Output 234 which has a connection 222 to transmit control signals for controlling one or more channels in switch control portion 212 of Power Module 210; a Waveform Generator 238 is configured to switch state of switch 212 from on to off, or any PWM percentage between on and off. In one embodiment, Waveform Generator 238 can be an executable set of software instructions that process external and internal control commands to provide switch information 239 to the Multi-Channel Output 234. Fault Detector 240, at least in one embodiment, an environmental data processor 242 can be configured to determine parameters with which to monitor operation of, for example, a load and the environment in which the load is disposed. For example, environmental data processor 242 can execute a set of software instructions that process real time information from sensors 214a and/or 214b to determine a state or functional operation of PCU outputs 216a & 216b. In one embodiment, environmental data processor 242 can produce Real Time Information (RT Info) as a function of sensor information from sensors 214a and/or 214b, and process that information in accordance with software instructions for use by Fault Detector 240 or Waveform Generator 238.

Note that sensor 214a and sensor 214b can each represent one or more sensors for determining one or more parameters. Examples of sensors 214a and 214b can include any sensor for monitoring and/or detecting any type of parameter, such as time, voltage, current, temperature, pressure, flow, speed, position, vibration, acceleration, audible sound energy, proximity of an object, humidity, smoke, chemical, and the like. As such, sensors can provide parameters to controller 230 can modify the application of power at output 216a and/or output 216b. In some embodiments, environmental data processor 242 can determine a parameter as a derived parameter based on one or more measured parameters. A derived parameter can be any combination or derivative of one or more one or more measured parameters. For example, a derived parameter can result from the implementation, for example, of a transfer function, one or more mathematical equations, or the like.

One or more inputs 201 and one or more outputs 216 can be coupled to any device, which includes power generation sources and loads, as well as both. In at least some embodiments, one or more inputs 201 can be coupled to a source or power, such as a power generation source (e.g., generators, solar cells as well as other solar-based power generators, fuel cells, alternators, and the like), and/or an energy store (e.g., a battery, a capacitor (e.g., an UltraCap, which can be an electrochemical double layer capacitor), or the like. In at least some embodiments, one or more outputs 216, such as outputs 216a and 216b can be coupled to any load, such resistors, heaters, motors (e.g., window, wipers, fans, etc.), lights, fans, electronics (e.g., communication radio, electronic controller, ABS system and components, engine controller, transmission controller, etc.), sensors (including arrays of sensors), and the like. Input 201 and output 216 can be coupled to a device that behaves as a power generation source (e.g., during a first interval of time) and a load (e.g., during a second interval of time).

Communication 232 portion of PCU 200 is a physical connection to a network link 204 on which information is sent to and from the PCU 200, and control and configuration are sent to the PCU 200. Further, controller 230 can include memory 236, such as Non-Volatile Memory, to store instructions and data as software source code to configure PCU 200, for example, response to measured parameters from sensors 214.

Figure 3:
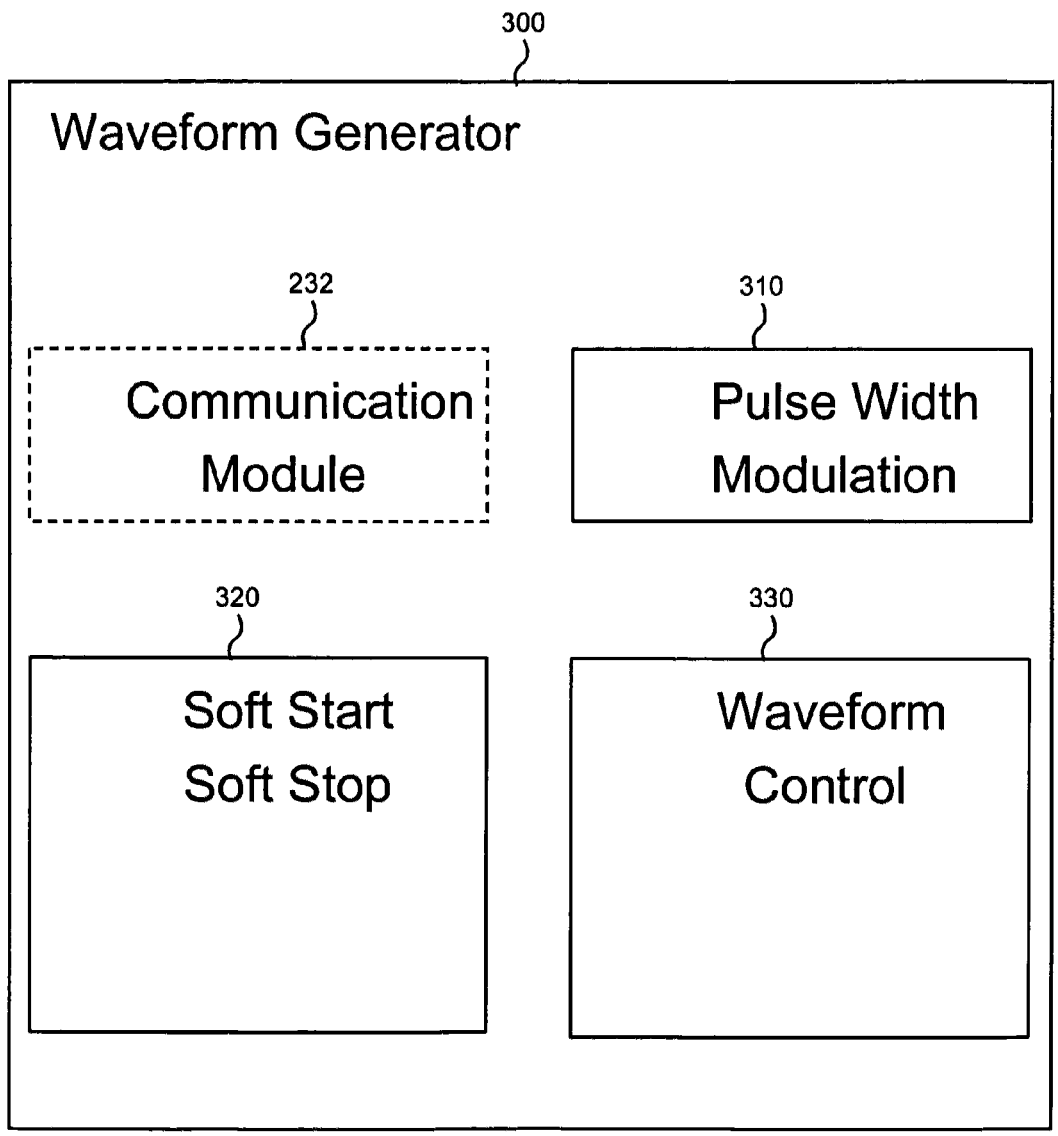
FIG. 3 is a diagram of an example of a waveform generator in accordance with a specific embodiment of the present invention.

FIG. 3 is a diagram of an example of a waveform generator 300 in accordance with a specific embodiment of the present invention. Waveform generator 300 can include a communications module 232 of FIG. 2, a pulse width modulation module 310, a soft start/soft stop module 320, and/or a waveform control module 330, any of which can be composed of hardware or software, or a combination of both. In at least some embodiments, pulse width modulation module 310 can be configured to modify an amount of power delivered in a power signal to a device, such as a load or power sink responsive to a mode of operation and/or a fault condition. For example, a mode of operation for a vehicle's head lamps might require them to dim for in either an energy conversation mode or in a night battle mode. Thus, pulse width modulation module 310 can deliver a percentage of the available power by modifying a duty cycle for the power signal. In at least some embodiments, soft start/soft stop module 320 can be configured to modify the rate at which power is applied to a target, such as a motor, battery, or a power bus, as well as modify the rate at which power is removed from the target. In at least some embodiments, waveform control module 330 can be configured to shape one or more portions of the waveform of a power signal to, for example, modify the rate of change (e.g., the slope of the leading or trailing edge of a waveform, as well as frequency), the amplitude, and the like. For example, waveform control module 330 can provide a power signal with an amplitude in the range of 0 to 55 volts or more, according to at least some embodiments. Further, waveform control module 330 can provide a power signal with a current in the range of 0 to 100 amperes, or more. In various embodiments, the power signal can provide DC or AC voltages and currents, and provide power signals at more than 55 volts and/or 110 amperes.

Figure 4:
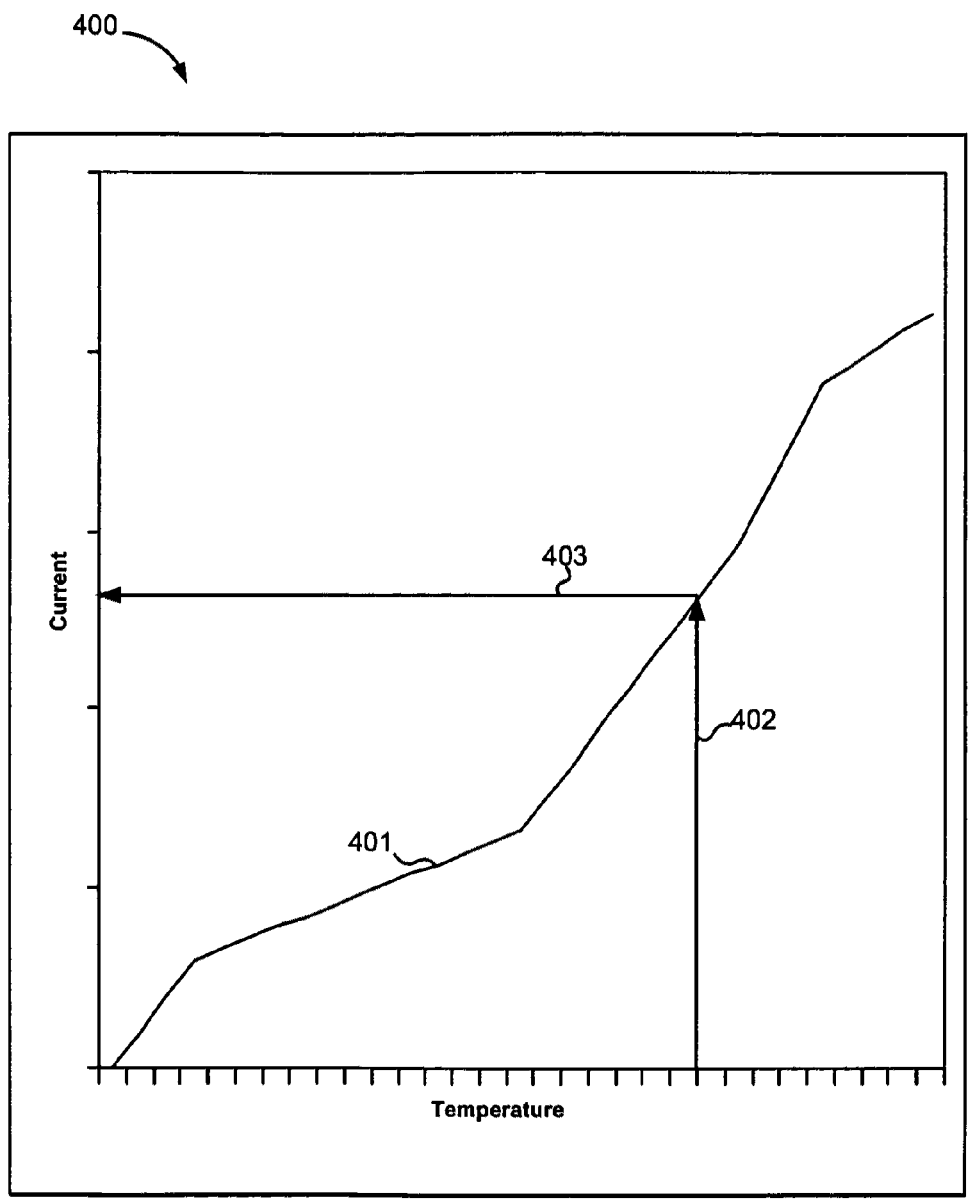
FIG. 4 is diagram showing an example of a current provided to a fan motor by a PCU as a function of temperature, according to one embodiment.

In various embodiments, PCU 200 of FIG. 2 operates to deliver power in response to conditions using waveform generator 300. For example, if the PCU 200 were used to maintain a certain temperature for operation of a target entity, such as a battery (not shown), it can control the speed of a fan, based—in whole or in part—on the need to cool the battery. FIG. 4 is diagram 400 showing an example of a current provided to a fan motor by a PCU as a function of temperature, according to one embodiment. In this example, an external temperature sensor 214b would be used to sense battery temperature 402. Through a look-up table or mathematical function in memory 236 or as controlled externally through communication module 232, waveform control 330 produces a current 403 resulting from fan control profile 401. In another example, the PCU can be configured to sense the signal going into a speaker through an external sensor 214b and control intensity of a light based on characteristics of the signal. In this case, the light can change intensity synchronously with music. Waveform Control 330 can be configured to control the PCU 200 output current 216 based on configurable patterns such as square waves, sine waves, sine waves with noise ripples, step levels, current drops, etc.

Figure 5A:
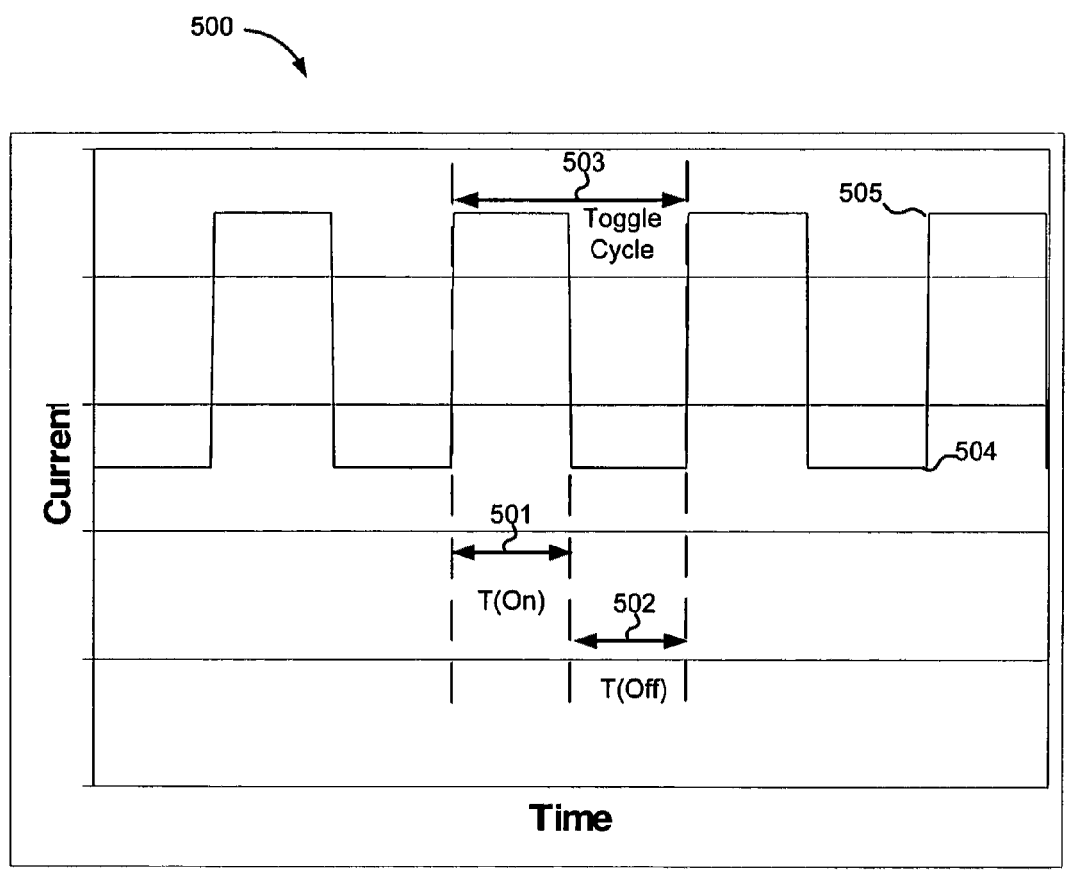
FIG. 5A is a diagram showing an example of On/Off Toggling as a function of time, according to one embodiment.
Figure 5B:
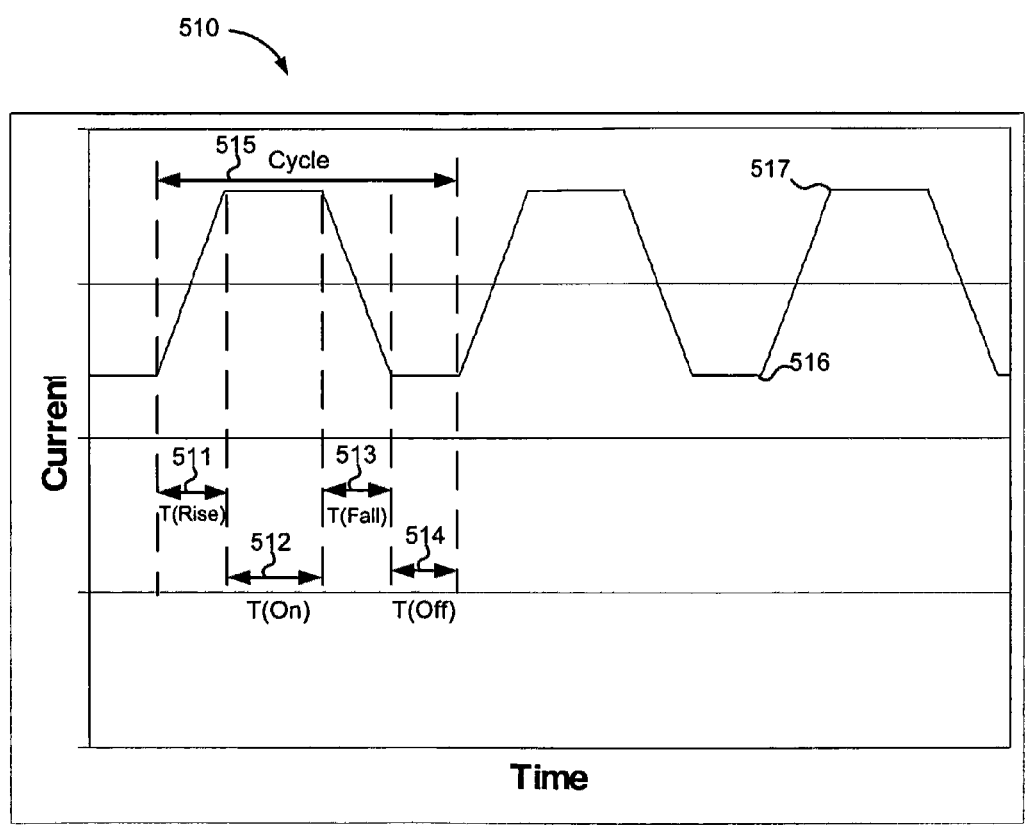
FIG. 5B is a diagram showing an example of Ramp to On/Ramp to Off Toggling as a function of time, according to one embodiment.
Figure 5C:
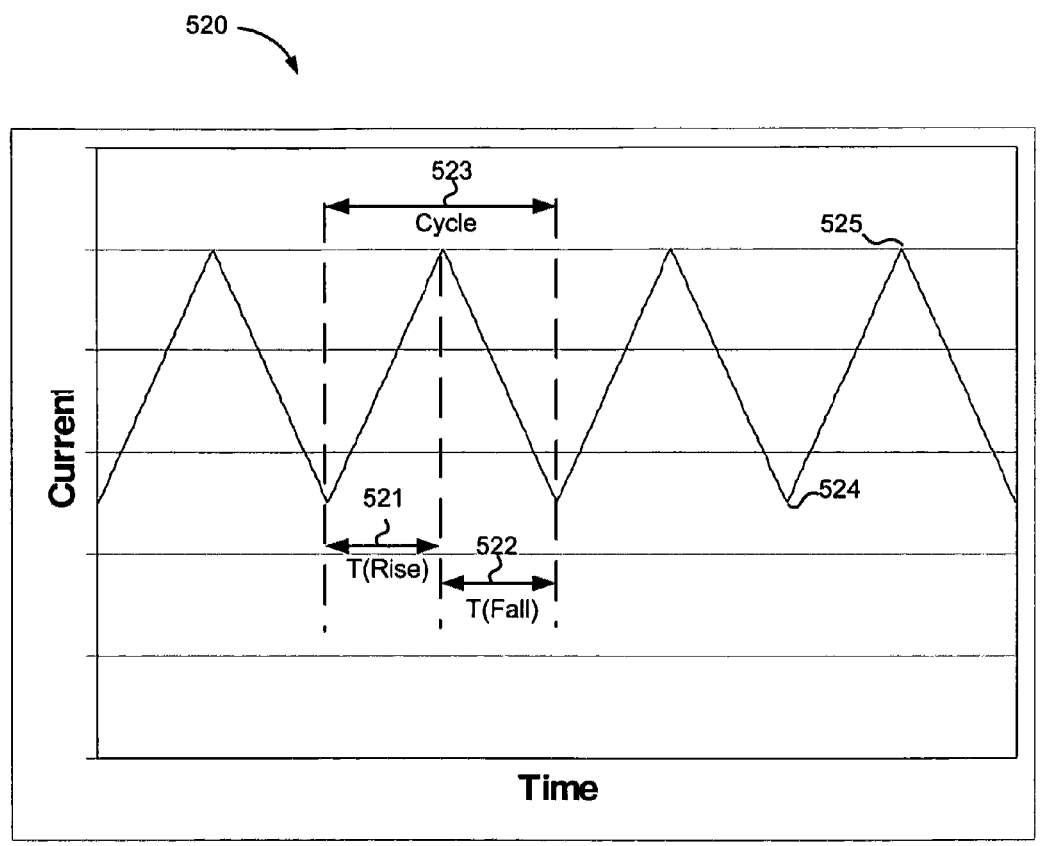
FIG. 5C is a diagram showing an example of Sawtooth Wave Generation Ramp On/Ramp Off Toggling as a function of time, according to one embodiment.
Figure 5D:
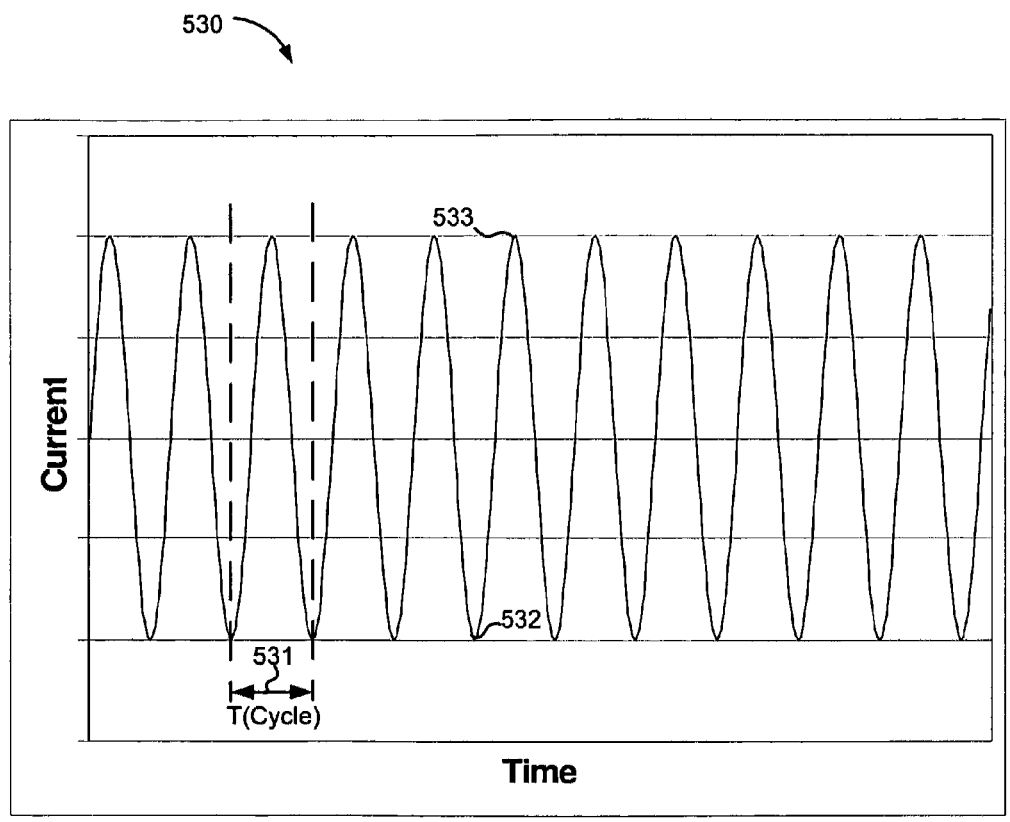
FIG. 5D is a diagram showing an example of Sinusoidal Wave Generation as a function of time, according to one embodiment.
Figure 5E:
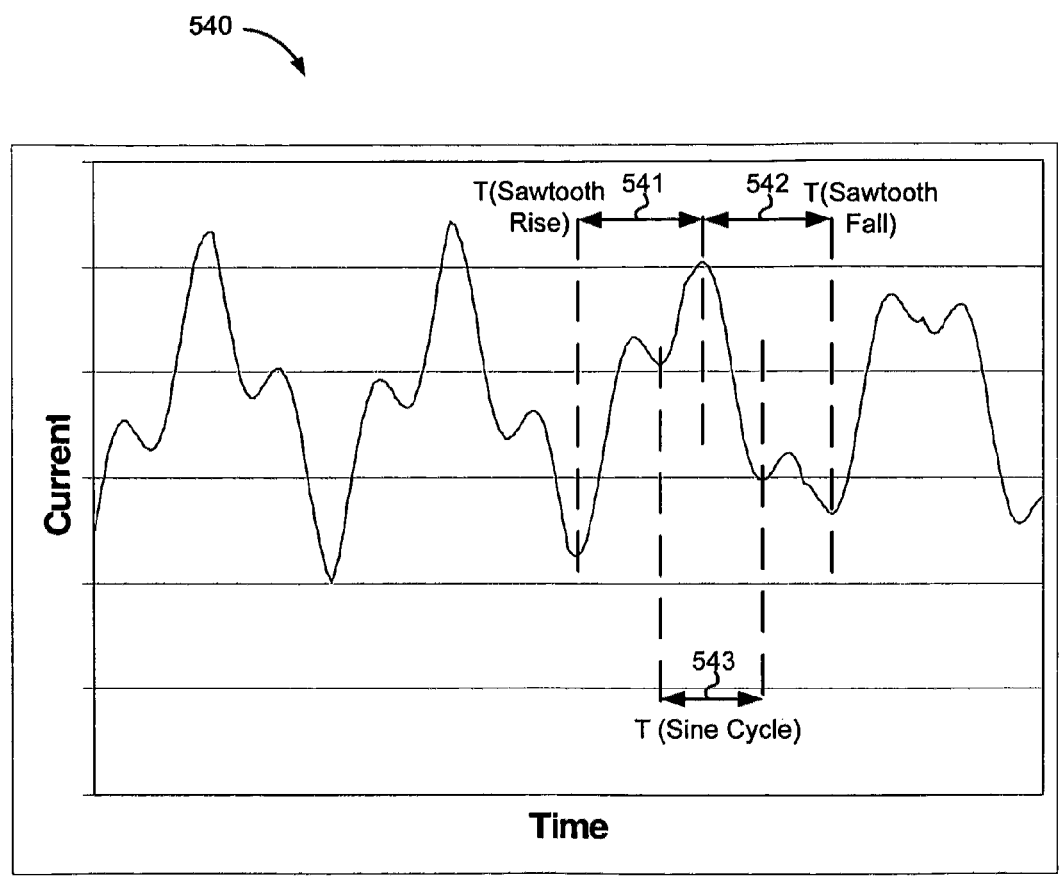
FIG. 5E is a diagram showing an example of a summation of Sawtooth Wave Generation and Sinusoidal Wave Generation as a function of time that can be programmed at the point of load to, for example test robustness of electronics, according to one embodiment.

FIGS. 5A to 5E depict examples of waveforms that can generated by waveform generator 238 of FIG. 4. FIG. 5A is a diagram 500 that shows a waveform generated to include an on/off toggle with an "on" duration 501 and an "off" duration 502, both which constitute a toggle cycle 503. Controller 230 of FIG. 2 can control the number of toggle cycles 503, which can be programmable, from 1 toggle cycle to on-going toggle cycle while power is applied to PCU 200. The programmable number of cycles can facilitate cycle testing. For example, a motor might be exercised to failure by applying waveform 500 to the motor until it fails, at which the number of cycles can be compared with other number of cycle that other failed motors experience. In another example, a comparative motor life study could be performed to objectively determine the benefits of implementing a ramp-to-on/ramp-to-off toggle waveform as shown in diagram 510 of FIG. 5B. In this example, a ramp-to-on (soft-start) 511 can be performed, followed by an on-time 512, followed by a ramp-to-off (soft-stop) 513, followed by an off-time 514. Waveform 510 can be applied to a motor to failure to determine if soft-start soft-stop extends the life of a motor under test. In other examples, waveform generator 300 can generate sawtooth waveforms as shown in diagram 520 of FIG. 5C. The sawtooth waveforms can be applied to loads for evaluating the loads. In this example, a ramp-up 521 to a maximum 525, which can be followed by a ramp-down 522 to a minimum 524, thereby forming a sawtooth cycle 523. This can determine whether an electronic module is robust over a certain power range. Waveform generator 300 (e.g., under control of waveform control module 330) can generate a sinusoidal waveform, as depicted in diagram 530 of FIG. 5D. Here, the sinusoidal waveform is shown to have a cycle time 531, a minimum 532, and a maximum 533. In various embodiments, waveform generator can generate complex waveforms, an example of which is depicted as a waveform in diagram 540 of FIG. 5E. The waveform in FIG. 5E can be produced through the summation of a sawtooth waveform of FIG. 5C (which can be seen in the sawtooth rise 541 and sawtooth fall 542 portions of waveform 540) and the sinusoid waveform of FIG. 5D (which can be seen in the sinusoidal cycle 543 of waveform 540). A complex waveform such as this, for example, can be applied to an electronic module, such as an anti-lock brake module, to ensure that challenging power waveforms to the electronic module and/or to the antilock brake sensors can be handled in a robust fashion (e.g., within predetermine thresholds or tolerances) and do not cause a failure (e.g., inadvertently lock-up the brakes). In other examples, power waveforms can be recorded and implemented in memory 236 to study and improve operation of an electronic module or sensor array.

Figure 6:
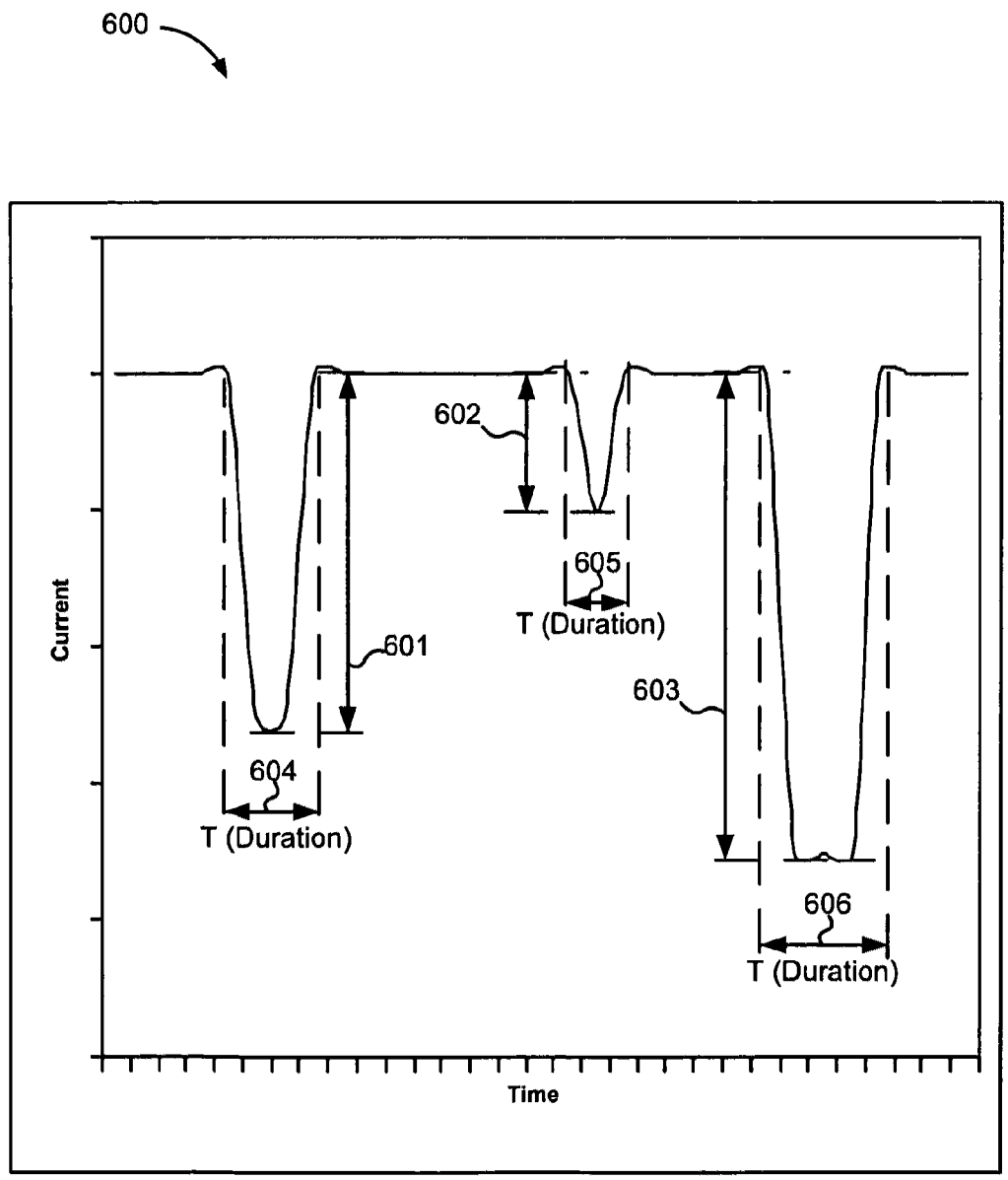
FIG. 6 is diagram showing current variations that can be programmed at the point of load to, for example, test robustness of electronic, according to an embodiment of the invention.

FIG. 6 is diagram 600 showing current dips that can be programmed at the point of load to test robustness of electronic loads with in a system. Power dips may be of interest from a test and evaluation standpoint. In this example, the first dip has a duration 604 and a magnitude 601, the second dip has a duration 605 and a magnitude 602, and the third dip has a duration 606 and a magnitude 603. For example, the operation of a load can be evaluated to see if either duration 606 or magnitude 603 causes a malfunction. Or, if either duration 606 or magnitude 603 is not compliant with respective thresholds, then a PCU can take corrective action, according to at least some embodiments. As an example, consider that the arrangement of power dips (in timing and magnitude) in diagram 600 can cause a loud "pop" issue in a radio system. In this case, a radio designer model a power source that provides the power dips to test whether the radio system can operate under such dip patterns. In various embodiments, such testing can be in design, production, and/or in-situ.

As noted in the examples above, complex power waveforms can be generated by a PCU, which can be especially beneficial for use as a challenging electrical stimulus to loads and/or microprocessor-based modules for the purposes of testing. Further, PCU 200 of FIG. 2 can perform control patterns. In the case of a headlight, PCU 200 could be configured with different patterns that can be used, for example, as an indicator or for visual communication purposes, such as an S.O.S. pattern to visually call for help. That is, Waveform Generator 300 of FIG. 3 can cause controller 230 of FIG. 2 to modulate operation of switch 212 to enable power to flow from input 201 to output 216 in a pattern as follows: 0.5 seconds on, 0.5 seconds off, 0.5 seconds on, 0.5 seconds off, 0.5 seconds on, and 0.5 seconds off to form an "S" in Morse code, 1.0 seconds on, 0.5 seconds off, 1.0 seconds on, 0.5 seconds off, 1.0 seconds on, and 0.5 seconds off to form an "O" in Morse code, and 0.5 seconds on, 0.5 seconds off, 0.5 seconds on, 0.5 . seconds off, 0.5 seconds on, and 0.5 seconds off to form an "S" in Morse code. In at least some embodiments, Waveform Generator 300 can operate independently without communication 232 or can optionally receive control instructions from a power management application, giving the PCU 200 the ability to generate an unlimited variety of control outputs. Should communications drop, PCU 200 of FIG. 2 can operate without external instruction (e.g., it can operate in accordance to instructions stored in memory 236).

Figure 7:
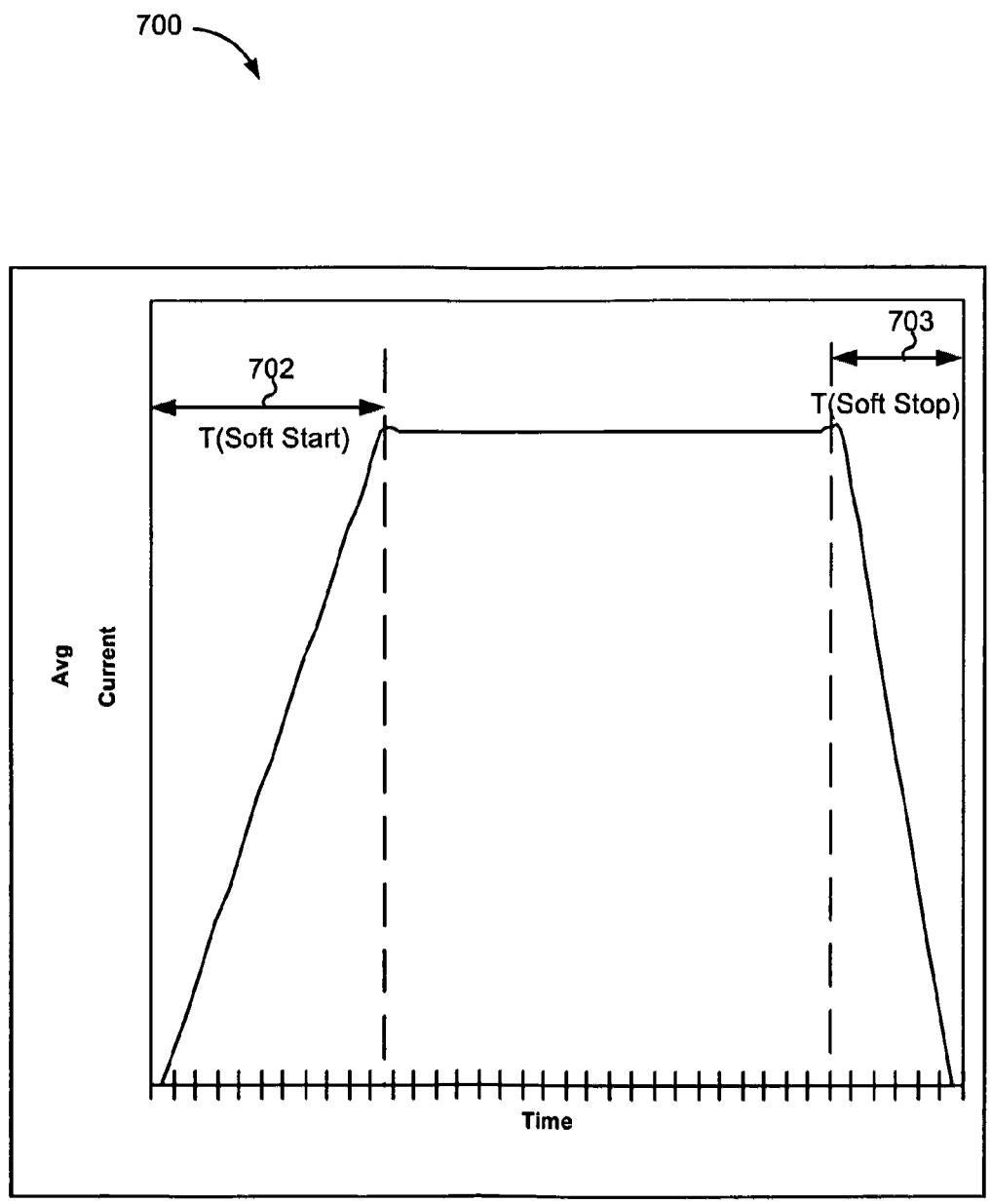
FIG. 7 depicts an example of soft starting and soft stopping implemented by a PCU, according to one embodiment of the invention.

Waveform Generator 300 can be configured to operate with Soft Start and or Soft Stop unit 320, according to at least some embodiments of the invention. The normal operation of a switch is to facilitate current to flow (e.g., a switch is closed) or not flow (e.g., a switch is open). In the case of turning a motor on, there can be a high amplitude/short duration current in-rush transient to the motor that has an impact on other components or power sources within a power system. Depending on the motor, electrical currents can peak to significantly higher than normal operating current. When the motor "transition from motor-off to motor-on" is controlled with PCU Soft Start, the in-rush current is eliminated. The Soft Start functionality of unit 320 can handle the transition from current minimum to current maximum. Soft Stop functionality of unit 320 can handle the transition from current maximum to current minimum. In the case of a light, a soft start can gradually turn the light on and soft stop would fade to off. FIG. 7 is a diagram 700 showing an example of a 10 second Soft Start 702 and a 5 second Soft Stop 703, according to one embodiment. In other embodiments, soft start 702 portion of the depicted waveform can be referred to a power-on portion of any power signal waveform, and soft stop 703 portion of the waveform can be referred to a power-off portion of a power signal waveform.

Figure 8A:
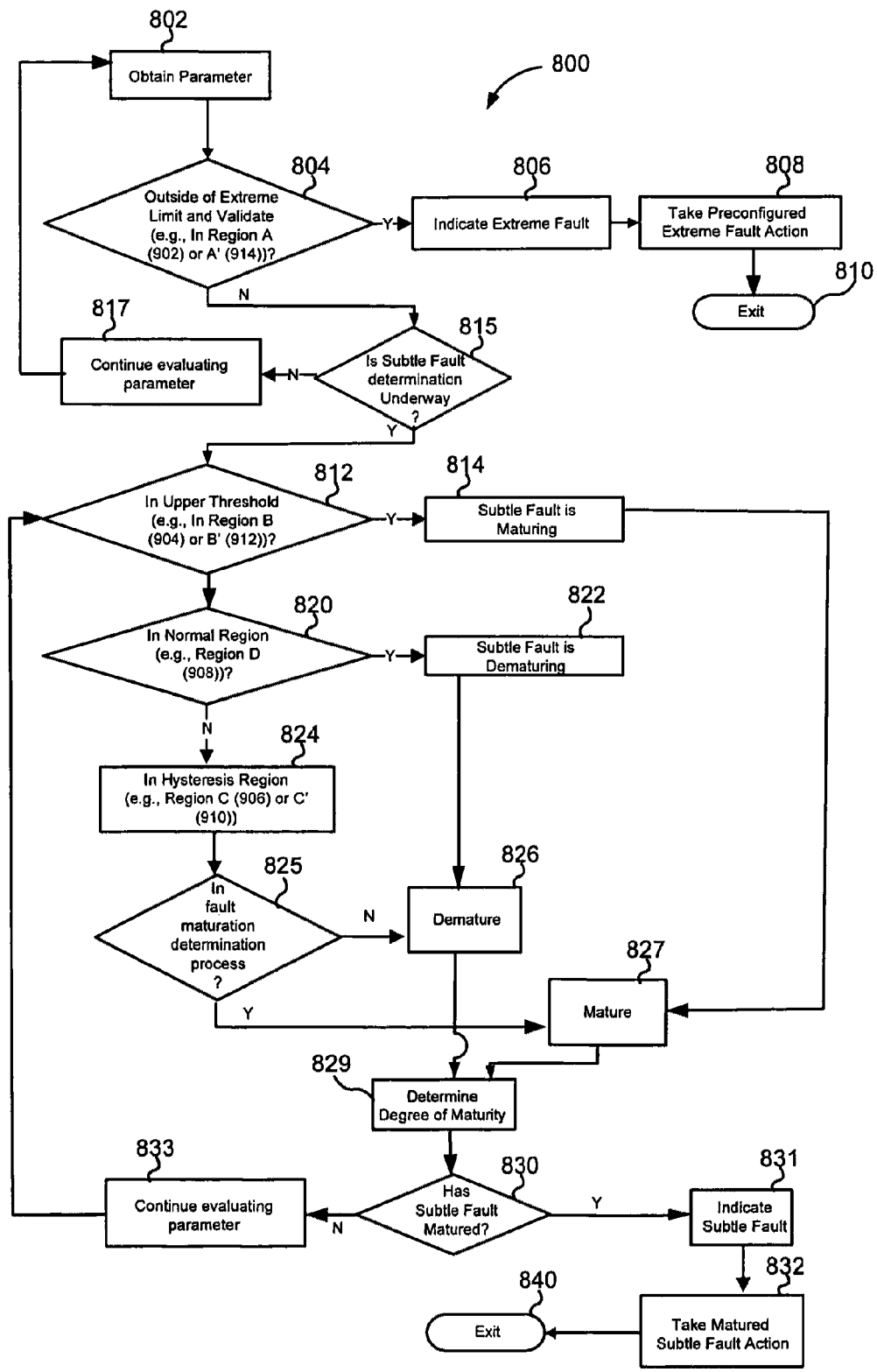
FIGS. 8A and 8B are examples of flows for detecting faults using a power control unit, according to various embodiments of the invention.

FIG. 8A is an example of a flow 800 for detecting faults using a power control unit, according to at least some embodiments of the invention. A power control unit can implement a fault detection process in accordance with flow 800 to detect one or more faults relating to any parameter, one or more derived parameters, mathematical expressions based on any one or more parameters, and the like. At 802, a parameter (or a value thereof) is obtained or sampled, for example, from a sensor to form an obtained parameter. In various embodiments, flow 800 can match a parameter (i.e., an obtained parameter) against one or more criteria (i.e., thresholds and/or levels), and can categorize the parameter into one or more fault categories, where different categories of faults can cause different actions (corrective or otherwise) to be undertaken. In this example, flow 800 determines whether an obtained parameter is associated with either a subtle fault or an extreme fault. As used herein, an "extreme fault," at least in some embodiments, refers to a valid fault. In some embodiments, an extreme fault is a value-based fault that need not require a duration of time to determine that a fault condition exists. In some instances, an extreme fault is a critical fault. An extreme fault, in some cases, can require an action to resolve the fault. As used herein, a "subtle fault," at least in some embodiments, refers to a fault that is not an extreme fault, but is associated with an obtained parameter that is subtly being disassociated with a normal range or threshold of operation. In some embodiments, a subtle fault can be a time-based fault that matures into fault after some period of time during which parameter value does not comply with values associated with normal operation (i.e., operation during which no faults exist or nascent faults are becoming subtle faults). In some cases, a nascent fault matures into a subtle fault. Thus, a subtle fault can be a function of historic values of the parameter. A subtle fault can invoke actions that may differ from those actions invoked by extreme faults. For example, a subtle fault, once detected, can cause generation of a notification message (e.g., a message notifying a user that such a fault exists for later correction), whereas an extreme fault can cause generation of a power-altering message (e.g., a message that is transmitted from a power control unit to modify the distribution of power in a system implementing one or more power control units). In some instances, a subtle fault requires a maturation process (i.e., fault maturation) to occur over time before a fault can be deemed a subtle fault, the subtle fault maturation process including both a fault maturation determination and a fault dematuration determination. The fault maturation determination is a process by which a subtle fault is determined or categorized. Generally, the fault maturation determination is a function of the degree of degradation of an obtained parameter (e.g., the degree to which a value for a parameter moves away, or diverges, from normal operation) over time. However, a potentially subtle fault need not mature into a subtle fault when the value of the parameter moves toward, or converges upon, the normal operating threshold over time. The fault dematuration determination is a process by which a value for parameter that is associated with a potentially subtle fault (e.g., undergoing fault maturation) can demature into a value that is deemed to be normal.

At 804, a determination is made as to whether the obtained parameter is associated with an extreme fault. In some embodiments, a value of a parameter can be determined to be associated with an extreme fault if the value of the parameter exceeds a threshold. For example, the value can be matched against thresholds 920 and 930 to determine whether the parameter relates to region ("A") 902 and region ("A") 914, respectively, in the diagram of 900 of FIG. 9A. In at least some embodiments, diagram 900 can be described as a fault profile that describes the conditions in which a parameter (or a value thereof) is associated with one or more fault conditions. That is, diagram 900 sets forth various parameter levels, thresholds and ranges for categorizing faults and as well as determining faults (e.g., performing maturation processes). Note that different parameters can have different fault profiles. Note further that a parameter (or the value thereof) can be matched against different fault profiles having different parameter levels, thresholds and ranges. For example, each mode of operation in which a power control unit (as well as the system in which the power control unit operates) can be associated with a corresponding fault profile that has different parameter levels, thresholds and ranges than the other fault profiles.

If the value is within (or substantially within) either region ("A") 902 or region ("A'") 914, then an extreme fault is detected at 806 of FIG. 8A. An indication that an extreme fault can be generated at 806 for consumption by a power control unit or power management application (i.e., to take some sort of action). An indication can be of any form, such as a flag or a message that includes data representing an indication that an extreme fault has been detected. At 808, an extreme fault action is performed, such as a preconfigured extreme fault action. For example, the extreme fault action can include an action of "communicating the condition" to "initiating a control action," which can initiate a corrective action. Note that the particular extreme action taken may be different for different modes of operation. For example, a power control unit can operate in a dependent mode under control of, for example, a centralized processor, such as a power management application ("PMA") of FIGS. 10A and 10B. The centralized processor can determine which extreme action the power control unit should take and communicate a message to the power control unit, which, in response to the message, performs the extreme action. Flow 800 can terminate at 810, or can resume fault detection processes to monitor other fault conditions. Further, a power control unit can operate in an independent mode, in which the power control unit determines the extreme action, such as turning off (i.e., power cessation) to the load.

But if flow 800 determines that the obtained parameter is not associated with an extreme fault condition, then flow 800 can continue to 815 to whether a subtle fault determination is underway (i.e., a potential fault or a nascent exists). If not, then the parameter continues to be evaluated at 817 to monitor the parameter. If so, then flow 800 moves to 812, at which a determination is made as to whether the obtained parameter exceeds a first trigger level associated with a subtle fault, the first trigger level specifying the initiation of a fault maturation determination. An example of a first trigger level is threshold 922 of FIG. 9A (or threshold 928 for the lower values of the parameter). In some embodiments, a value of a parameter can be determined to be associated with a subtle fault if the value of the parameter exceeds a threshold for a duration of time. For example, the value can be matched against thresholds 922 and 928 to determine whether the parameter relates to region ("B") 904 and region ("B'") 912, respectively, in the diagram of 900 of FIG. 9A. If the value of the parameter is not within region ("B") 904 or region ("B'") 912, then flow 800 of FIG. 8A continues in 812 to determine whether a potential subtle fault has been detected and may be maturing or dematuring. If the parameter is determined to exceed the first trigger level (and have a value, for example, below an extreme fault level) at 812, then the subtle fault, as a nascent fault, is maturing at 814 and an optional indication of the maturing status of the parameter can be generated. Flow 800 then can continue to 827 at which a maturation action can be taken to mature the nascent fault. In some examples, a maturation counter can be incremented.

But if the parameter is determined to not exceed the first trigger level) at 812, then flow 800 continues to 820, at which is determination is made as to whether the value of the parameter is within acceptable (i.e., normal) range of values of operation. If so, then a second trigger level has been reached, the second trigger level specifying the initiation of a fault dematuration determination. For example, the value of the parameter can be associated with the valued of region ("D") 908 of FIG. 9A. An example of a second trigger level is threshold 924 of FIG. 9A (or threshold 926 for the lower values of the parameter). The subtle fault, as a nascent fault, is dematuring at 822 and an optional indication of the dematuring status of the parameter can be generated. Flow 800 then can continue to 826 at which a dematuration action can be taken to demature the nascent fault to extinguish the potential fault condition. In some examples, the maturation counter can be decremented, or a dematuration counter can be incremented. If not, then the second trigger level has not been reached and flow 800 continues to 824. Thus, the value of the parameter is between the values associated with the first and second trigger levels, both of which define, for example, a hysteresis region. For example, the value of the parameter can be associated with either region ("C") 906 or region ("C'") 910. Next, flow 800 continues to 825 at which a determination is made as to whether a fault maturation determination process is pending (e.g., based on a previously sampled value of the parameter that exceeds the first trigger level). If so, then flow 800 can continue to 827 at which a maturation action can be taken to mature the nascent fault. If not, then a fault dematuration determination process is pending and the flow continues to 826 at which a dematuration action can be taken to demature the nascent fault.

At 829, flow 800 retrieves information specifying the states of dematuring as determined in 826 and maturing as determined in 827, and the flow can determine the degree of maturity associated with the parameter. For example, a value of a dematuration counter can be subtracted from a value of a maturation counter to determine the degree of maturity. In at least some embodiments, the degree of maturity can represent amount of accumulated time (e.g., an interval of time) that a value of a parameter has exceeded a normal range of operation after a first trigger level is surpassed. Flow 800 can flow to 830 at which a determination is made as to whether the potential subtle fault has matured into a fault (e.g., a subtle fault). For example, the degree of maturity determined at 829 can be compared against a threshold degree of maturity. If the degree of maturity meets or exceeds the threshold degree of maturity, then the nascent fault is deemed to have matured into a subtle fault, which can be indicated at 831. At 832, a matured subtle fault action can be performed, after which flow 800 can be terminated at 840, or can continue at 802 (not shown). For example, the subtle fault action at 832 can include "communicating the condition" to "performing a control action." Note that the matured subtle fault action may be different for different modes of operation. For example, a power control unit can operate in a dependent mode under control of, for example, a centralized processor, such as a power management application ("PMA") of FIGS. 10A and 10B. The centralized processor can determine which matured subtle fault action that the power control unit should take and communicate a message to the power control unit, which, in response to the message, performs the matured subtle fault action. Further, a power control unit can operate in an independent mode, in which the power control unit determines the matured subtle fault action, such as decreasing power applied to a load.

If the degree of maturity does not meet or exceed the threshold degree of maturity, then the nascent fault is not yet deemed to have matured into a subtle fault, and may continue either maturing or dematuring. Thus, flow 800 can transition to 833 to continue evaluating the parameter value to determine whether the nascent fault either matures into a subtle fault or dematures, thereby extinguishing the pending fault condition. Note that the fault profiles and their thresholds, such as thresholds 920, 922, 924, 926, 928, and 930 of FIG. 9A, as well as maturation times 942 and 946, can be programmed and stored in, for example, a memory. Note further that the thresholds can also be configured to "inactive" in some cases. Maturation times 942 and 946 can represent threshold degrees of maturity against which a degree of maturity can be matched. In at least some embodiments, more or less than the levels depicted in FIG. 9A can be implemented.

Figure 8B:
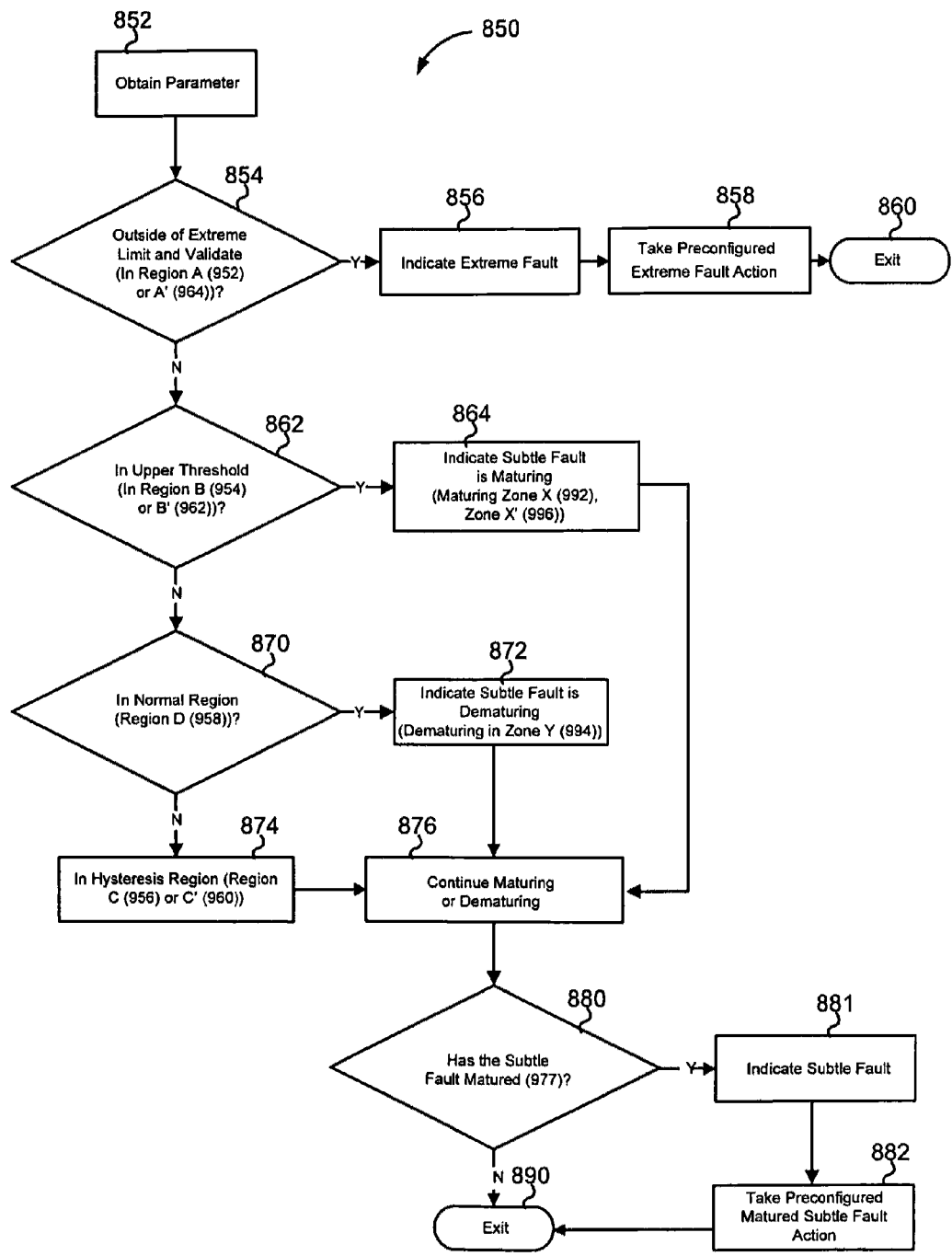

FIG. 8B is an example of a flow for detecting faults using a power control unit in a specific implementation, according to an embodiment of the invention. To illustrate the flow of FIG. 8B, consider the example of the fault profile of FIG. 9B to determine types of faults, according to at least one embodiment of the invention. The following example of a fault detection process, as applied to motor current, illustrates a fault determination processes that implement at least some of the aspects of flow 800 of FIG. 8A. Referring to FIG. 9B, consider diagram 950 is a fault profile for motor current, which is depicted as parameter 951, for a window motor during at least one mode of operation. In this example, a window motor is closing a window of a vehicle, and the values of a window motor current (as parameter 951) are considered to be within a range of acceptable operation in region ("C'") 960, region ("D") 958, and region ("C") 956. Next, consider that a window operated upon by the window motor has ice build-up at a first point of time 971 (i.e., between ("W") 990 and zone ("X") 992) and it takes more current than is typical to move the window. Thus, the window current may operate in region ("C") 956 and region ("B") 954 in zone ("X") 992, as shown in FIG. 9B. In another example, the motor might be bound with sand and grit, causing the current to operate in region ("C") 956 and region ("B") 954. In yet another example, an object in the path of the window or a short circuit in the motor can cause the current to transition (e.g., quickly transition) over an extreme fault threshold 970 into region ("A") 952.

Referring to FIGS. 8B and 9B, consider the motor current, as parameter 951, is sampled at 852 of flow 850 of FIG. 8B, and that the window current transitions over threshold 971 into region ("B") 954 of FIG. 9B, which is between thresholds 972 and 970. Since the values of the current do not surpass extreme fault threshold 970, flow 850 of FIG. 8B moves through 854 to 862, at which 862 determines that the current has entered at least region ("B") 954. As shown, the values of the current are sampled for an interval of time 942 within in either region ("C") 956 or region ("B") 954 of FIG. 9B. During interval of time 942, a subtle fault starts to mature at 864 of FIG. 8B, and flow 850 continues to 876 to continue determining that the subtle is maturing (or dematuring). As shown in FIG. 9B, the window current transitions back into the normal region ("D") 958 at a second point of time 973 (between zone ("X") 992 and zone ("Y") 994). Referring back to FIG. 8B, flow 850 determines that the parameter value associated with pending subtle fault is in normal region ("D") 958 at 870. Thus, flow 850 moves to 872 while the subtle fault dematures while the current is in either region ("D") 958 or region ("C") 956 of FIG. 9B. Since the subtle fault does not mature at 880 of FIG. 8B, then flow 850 continues, or terminates at 890.

As shown in FIG. 9B, the values of the current steadily increase during interval of time 944a (i.e., zone ("Y") 994). Flow 850 of FIG. 8B passes through 854, 862, and 870 until a determination is made that the values of the current related to a hysteresis region at 874. Referring back to FIG. 9B, another subtle fault begins to mature after point in time 975, at which the window motor current exceeds threshold 972. Diagram 950 shows that the current matures during zone ("X') 996 until a subtle fault matured after a time interval 944b has elapsed at point in time 977. Time interval 944b can be referred to as the threshold degree of maturity, at least in some embodiments. Subsequently, flow 850 of FIG. 8B can perform a matured subtle fault action at 882, after identifying that a subtle fault has matured at 881. The matured subtle fault action can be handled by a power control unit during zone ("Z") 998.

Figure 10A:
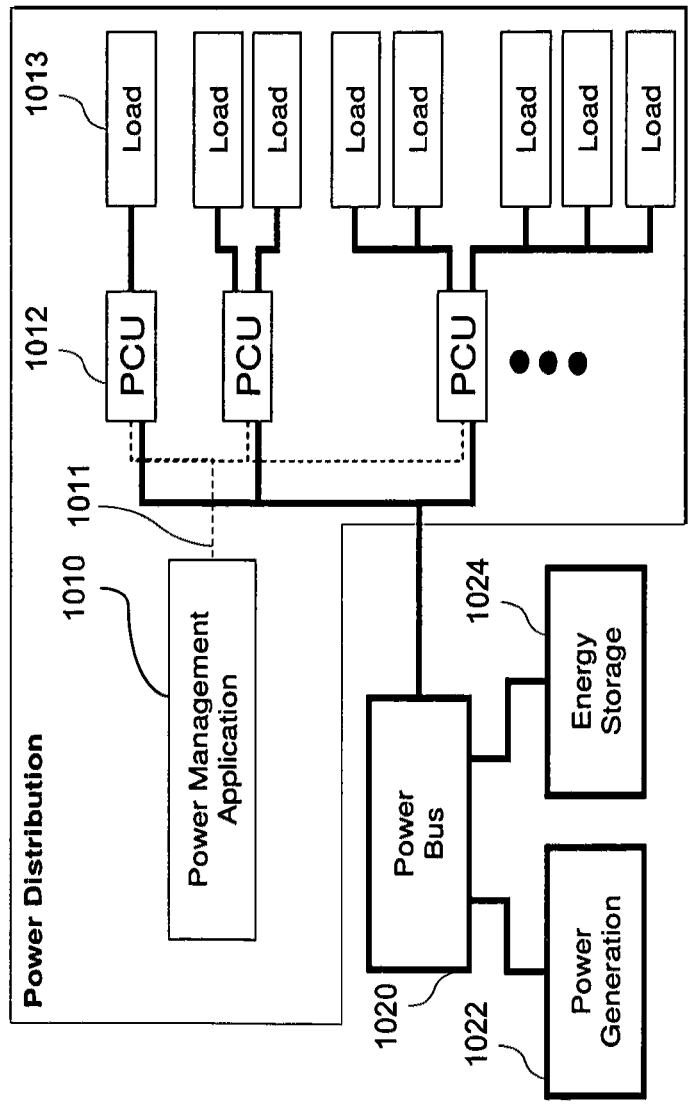
FIG. 10A illustrates a power distribution network including a number of PCUs each controlling power application to a load, according to various embodiments of the invention.

In some cases the power control unit is part of a system that is managed by either a centralized processor or processors (and a power management application ("PMA")) or a peer-to-peer management scheme. An example of the former is shown in FIG. 10A as power management application 1010. The power control unit can indicate the subtle fault condition to the power management application 1010, and power management application 1010 can respond with instructions describing how to handle the fault. Fault handling can also be performed by the power control unit, locally, if there is a loss of communication with the power management application 1010. In either case, if a subtle fault is occurring, another parameter such as temperature might be considered to determine the best course of action. For example, consider that temperatures are very low (e.g., freezing, below 0 degrees Celsius), and the fault condition is new. The motor may continue to operate with this subtle fault condition. But if temperatures were higher (e.g., higher than freezing, above 0 degrees Celsius), power management application 1010 might be used to indicate that the motor needs to be repaired (Condition Based Maintenance) or replaced to avoid over-heating, which low temperatures would otherwise minimize. To protect a system (e.g., a system of a motor, wiring, and the like), a power control unit might implement a matured subtle fault action, such as disabling a motor, unless overridden by an operator.

Note in at least some cases, consider that the window current transitions into the region ("A") 952, and the power control unit validates the fault and is deemed to be an extreme fault. The power control unit could be programmed to eliminate current to an electrical load, thereby protecting the load or preventing fire caused by short circuit arcing. Similar examples can apply to other parameters in other regions. For example, consider that a power control unit is tasked with monitoring a subsystem that maintains a pressure within a range of pressure values, but the subsystem has a slow leak. An under pressure fault condition can be considered as a matured subtle fault in region ("C'") 960 or region ("B'") 962 of FIG. 9B, whereas an extreme under pressure fault can be detected in region ("A'") 964 (i.e., once trigger level 980 is surpassed). An example of an extreme under pressure fault can be due to a severed hose. Other parameters, such as derivative parameters (e.g., speed, acceleration, and the like) and mathematically derived parameters (e.g., frequencies, and the like), can also be associated with a fault profile, such as shown in FIG. 9B, so that flow 850 of FIG. 8B can be applied thereto.

Figure 10B:
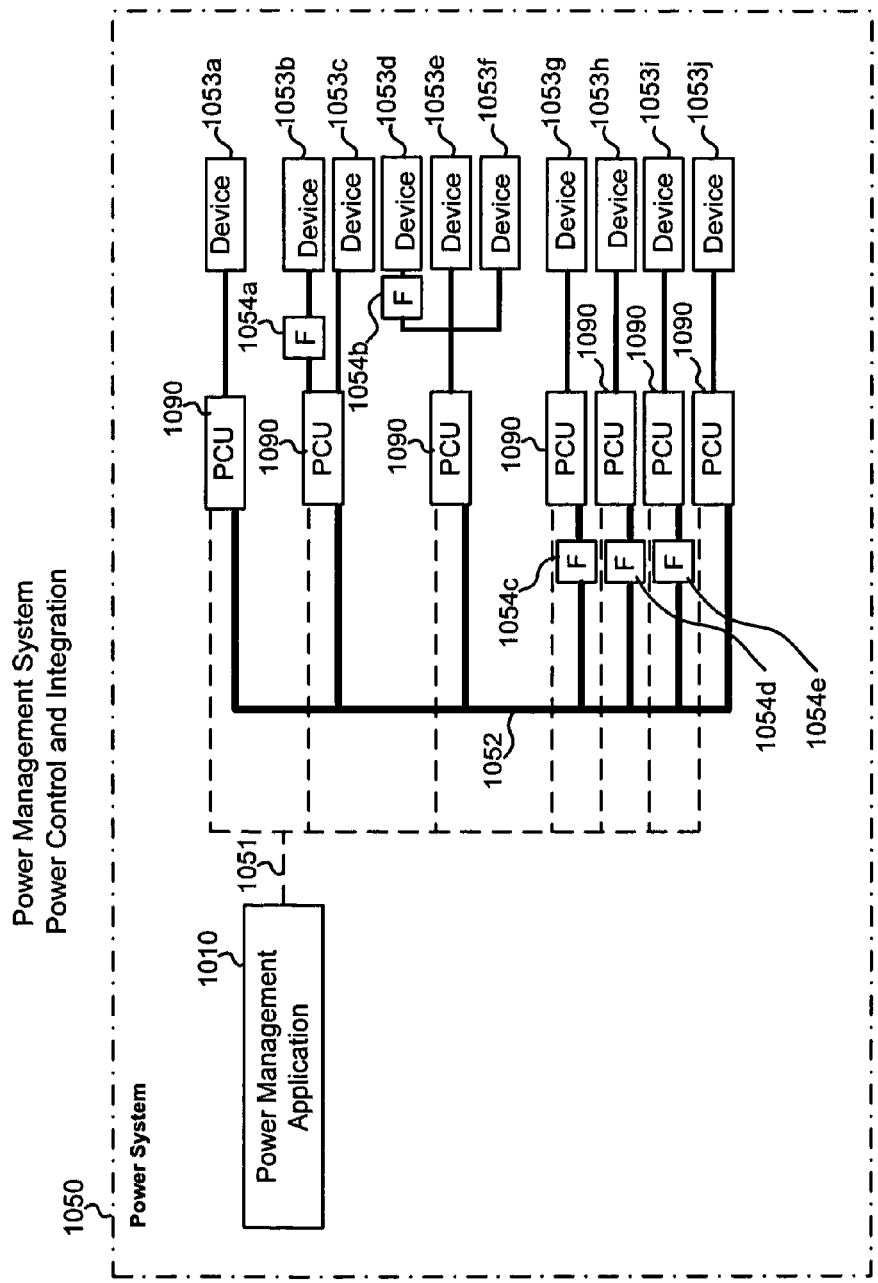
FIG. 10B illustrates a power distribution network including a number of PCUs, at least one of which can be configured to control power to and/or from a device that either sources or sinks power, or both, according to various embodiments of the invention.

FIGS. 10A and 10B illustrate examples of various power distribution networks that include a number of power control units, according to various embodiments of the invention. FIG. 10A depicts an example of a power distribution network including a power management application 1010, a power bus 1020 over which power can be distributed in relation to a variety of power generation devices 1022 and energy storage devices 1024, and number of power control units 1012, according to at least some embodiments of the invention. Each of power control units 1012 can be configured to apply power differently to corresponding loads 1013, based on a mode of operation for either the system implementing the power distribution network or a power control unit 1012. Further, a power control unit 1012 can modify power delivery to one or more loads 1013 based on the type of fault that might be occurring. Note that a power control unit 1012 can operate in a dependent mode under control of, for example, a centralized processor, such as a power management application 1010. The centralized processor can communicate a message to power control unit 1012 to control the power control unit's behavior for a pending mode change or fault condition, for example. In addition, a power control unit 1012 can operate in an independent mode, in which the power control unit determines fault action, for example, such as power cessation to the load.

FIG. 10B illustrates another power distribution network 1050, according to at least one embodiment. FIG. 10B shows a power management application 1010 configured to operate with a processor (not shown) to manage the actions of power control units 1090. Power management application 1010 is coupled via a communications link 1051 to communicate with power control units 1090. A power bus 1052 over which power can be distributed is also coupled to power control units 1090. FIG. 10B also shows a number of power control units that are configured to control the application of power from various devices that source power (devices 1053*g* through 1053*j*) and control the application of power to various devices that sink power (devices 1053*a* through 105*f*), any of which can be managed by a power management application 1010, which includes executable instructions (e.g., stored in memory 236 of FIG. 2) that can be processed by a power control unit, such as power control unit 200 of FIG. 2. Examples of devices 1053*g* through 1053*j* that source power include alternators, photovoltaic arrays, batteries (and other energy storage devices), and the like. Examples of devices 1053*a* through 1053*f* that sink power include motors, fans, lights, electronic modules, batteries (and other energy storage devices), and the like. In some examples or applications, additional hardware filtering 1054*a* through 1054*e* can be used to condition the various power signals. Note that the power control units, such as power control unit 200, can operate in various modes. Different modes allow for different performance levels based on parameters (as measured, for example, by sensors 214*a*, 214*b*), faults detection threshold, and/or instructions and operational profiles used by power management application 1010.

FIG. 11 depicts an example of a set of operational profiles for controlling operation of a power control unit, according to at least some embodiments. As illustrated in FIG. 11, a number of different waveforms can be generated by a waveform generator 300 of FIG. 3 can be determining by specific modes of operation, such as modes A, B, C, and D. Operational profile 1120 depicts a waveform applied to load, such as a fan motor described in FIG. 4. In this example, operational profile 1120 can be implemented during mode A, which can be a "normal operating mode" that is configured to optimize power consumption by detecting a temperature 1124 and producing a current 1126 as a function of waveform (or relationship) 1122. Operational profile 1140 can be implemented during mode B, which can be a special "silent mode" that is configured to reduce resonant frequency of a fan motor by reducing current to current 1146 for a certain temperature 1144 as a function of waveform (or relationship) 1142. Operational profile 1160 can be implemented during mode C, which can be an "operational fault mode" that is configured to operate with a pending type of fault by producing current 1166 at temperature 1164 as a function of waveform (or relationship) 1162. Operational profile 1180 can be implemented during mode D, which can be a "heavy sun" mode initiated by a sensed parameter, for example, such as signal generated by a sun sensor indicating heavy sunload. The greater the sunload, the higher the probability that cooling efforts will need to increase. Thus, a power control unit can control a fan (as a load) based on waveform (or relationship) 1182, which is configured to remedy a certain heavy sun condition.

Figure 12A:
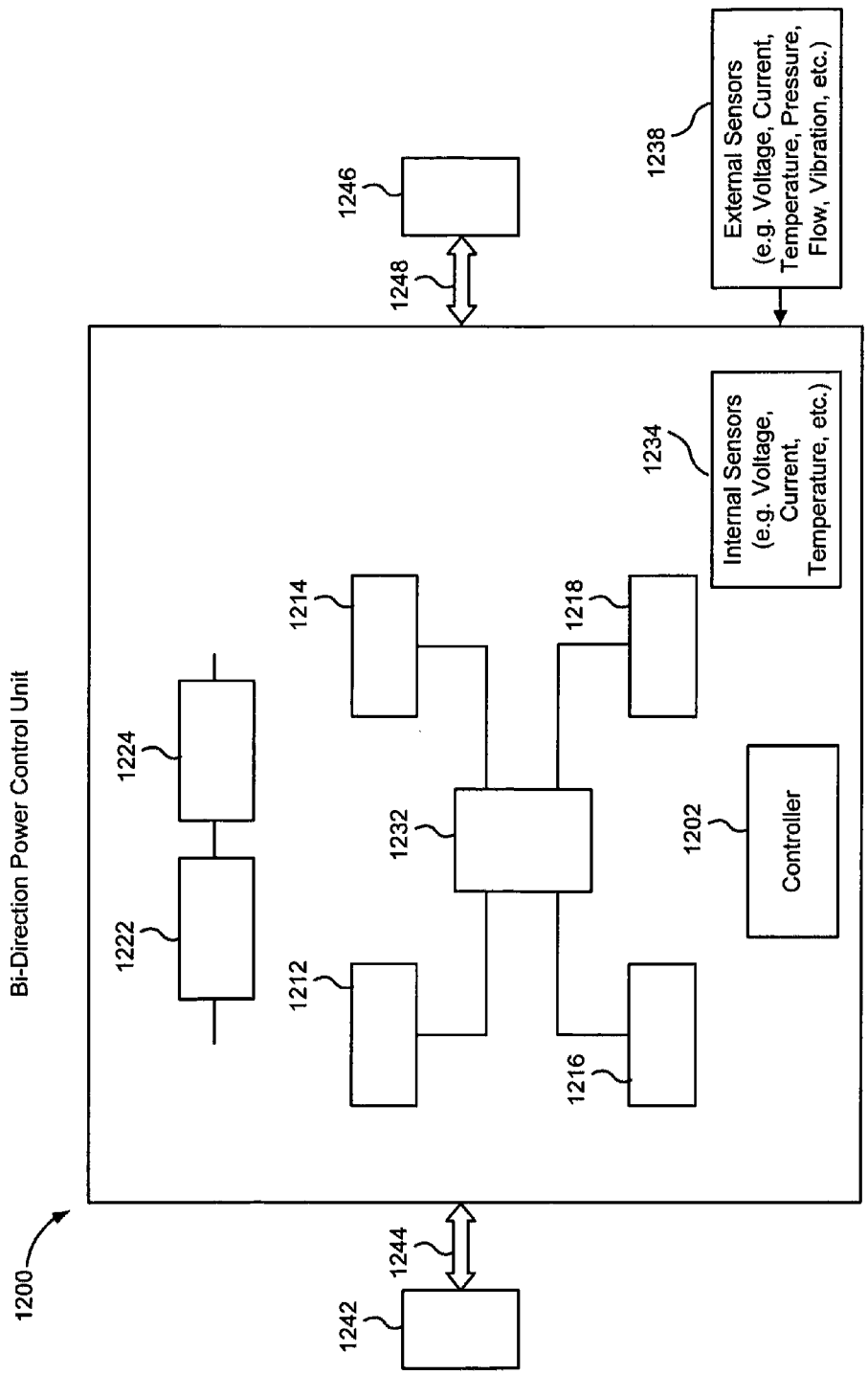
FIGS. 12A and 12B depict examples of bi-directional buck-boost power control units, according to various embodiment of the invention.
Figure 12B:
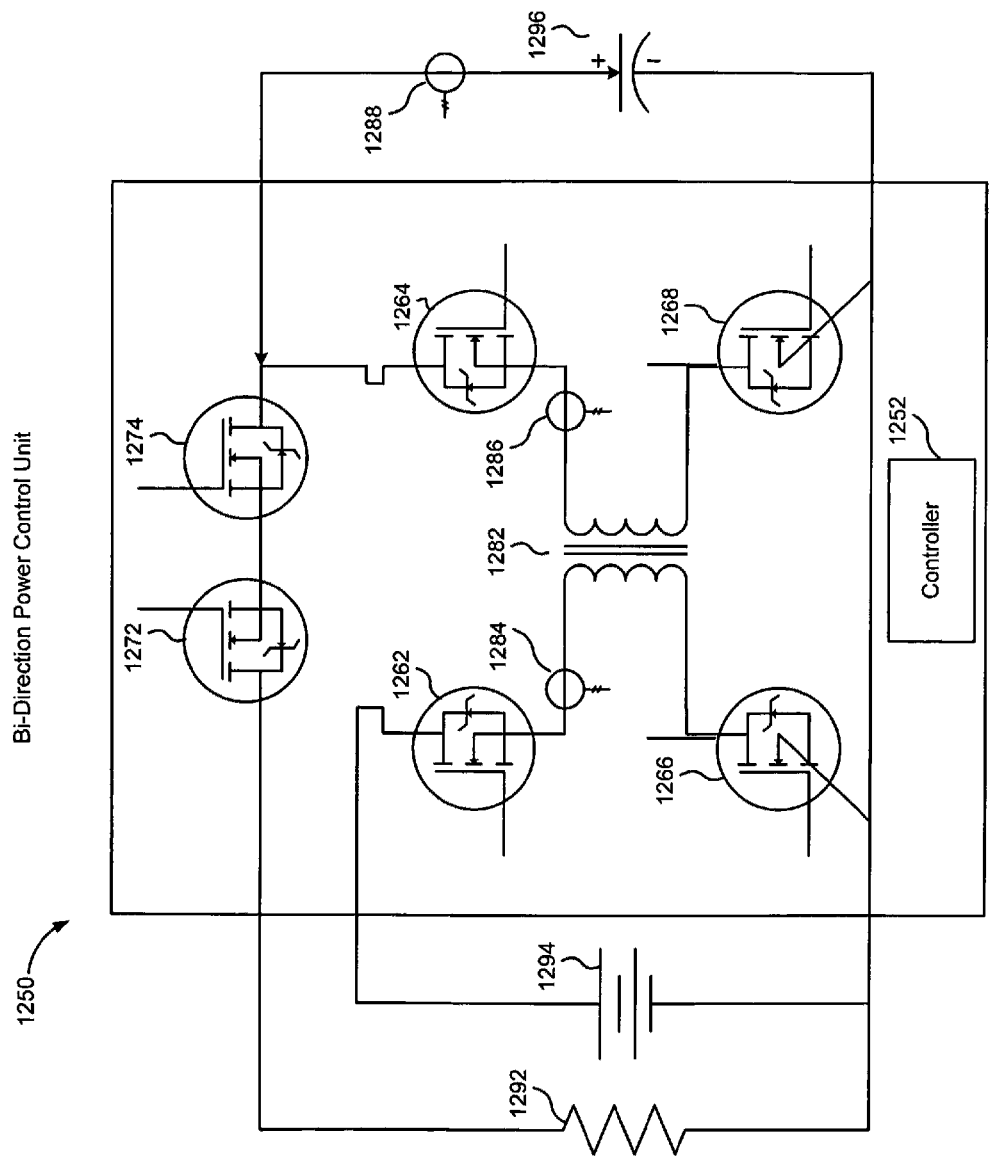

FIGS. 12A and 12B depict examples of bi-directional buck-boost power control units, according to various embodiment of the invention. A Power Control Unit ("PCU") can operate in various configurations. Referring to FIG. 12A, one such configuration is a bi-directional buck-boost Power Control Unit 1200, which includes a controller 1202 to control switching devices, such as switching devices 1212, 1214, 1216, 1218, 1222, and 1224 in a coordinated fashion. Power control unit 1200 also includes hardware device 1232, internal sensors 1234 and external sensors 1238. As such, bi-directional buck or boost current controls 1244 and 1248 can be achieved to facilitate interaction between devices 1242 and 1246.

FIG. 12B is a diagram showing an example one implementation of a bi-directional buck-boost power control unit 1250, according to one embodiment of the invention. FETs 1262, 1264, 1266, 1268, 1272, and 1274 can be controlled by controller 1252, and, with transformer 1282 and sensors 1284, 1286, and 1288, current and voltage can be controlled in a bi-directional buck-boost fashion. In one mode, power can be controlled from battery 1294 to an energy storage device, such as an ultracapacitor 1296. In another mode, power can be delivered from the ultracapacitor 1296 to a load 1292, such as a starter motor, for example. This implementation can be used to manage the charging of an ultracapacitor from an uncharged state. This implementation can also be useful to manage a starting system in extreme cold environments. In extreme cold, large amounts of current draw from a battery severely shortens the life of the battery. A large amount of current is demanded by a starting motor, especially when cold temperatures make engine block fluids viscous. Ultracapacitors can be used to deliver large amounts of current, but use large amounts of current. Using either a bi-directional buck-boost power control unit 1200 or a bi-directional buck-boost power control unit 1250 allows for managed current demand from the battery to the ultracapacitor and also allows for the ultracapacitor to deliver current to the starter motor. Other examples may include power control units or other switching devices 1212, 1214, 1216, 1218, 1222, and 1224 and other hardware 1232, such as inductors. The interconnections between devices can also be configurable. More or fewer elements shown in FIGS. 12A and 12B can be implemented to form bi-directional buck-boost power control units.

Figure 13:
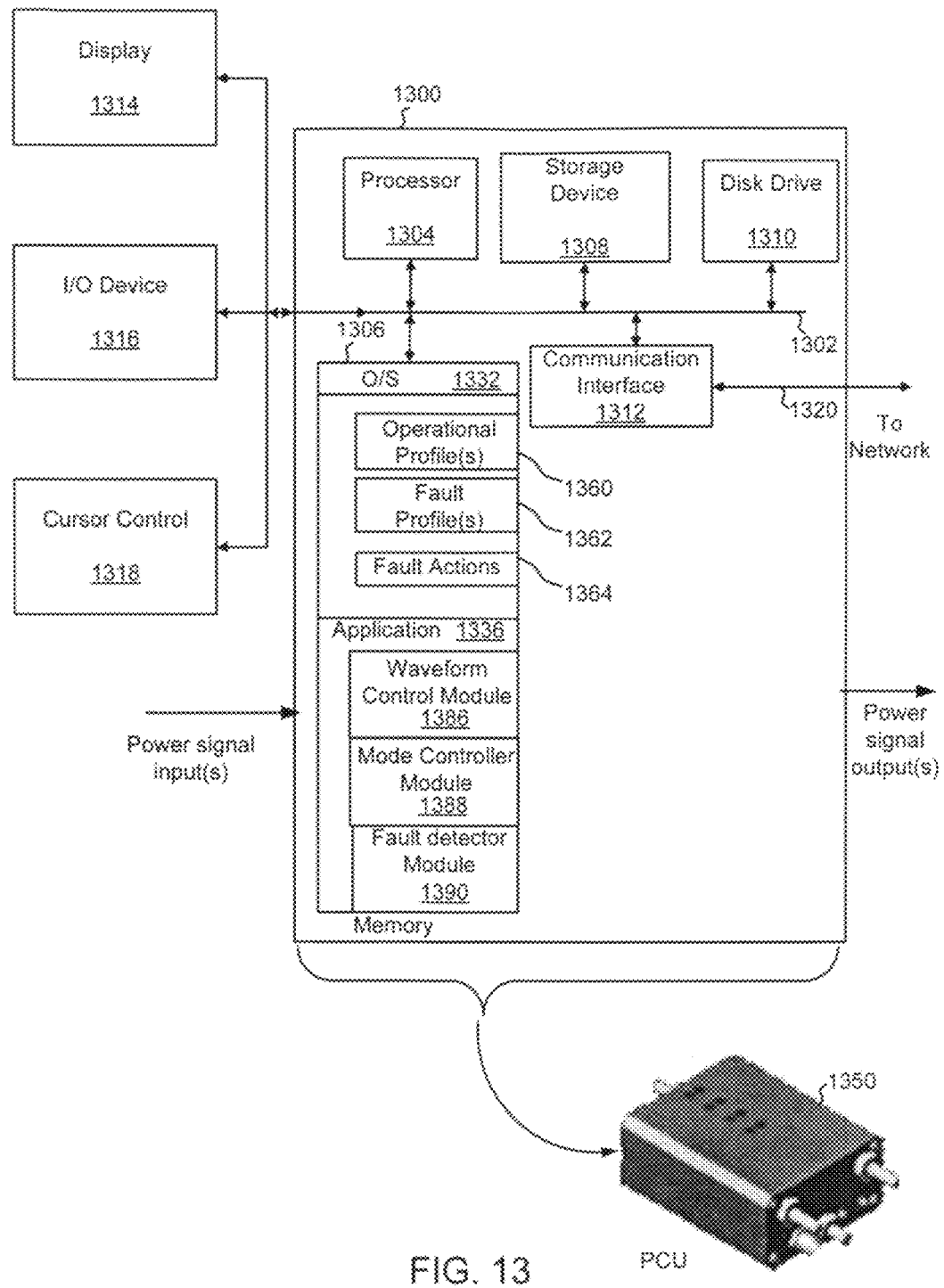
FIG. 13 illustrates an example of a processor-based system suitable for providing power controlling functionality to generate configurable power signals and/or to deliver power during fault conditions, according to at least one embodiment of the invention.

FIG. 13 illustrates an exemplary processor-based system suitable for providing power controlling functionality to generate configurable power signals and to deliver power during fault conditions, according to at least one embodiment of the invention. In some examples, processor-based system 1300 can be used to implement computer programs, applications, methods, processes, or other software to perform the above-described techniques and to realize the structures described herein. Processor-based system 1300 includes a bus 1302 or other communication mechanism for communicating information, which interconnects subsystems and devices, such as processor 1304, such as a microcontroller, a central processing unit, or the like, system memory ("memory") 1306, storage device 1308 (e.g., ROM), disk drive 1310 (e.g., magnetic or optical), communication interface 1312 (e.g., modem or Ethernet card), display 1314 (e.g., CRT or LCD), input device 1316 (e.g., keyboard), and cursor control 1318 (e.g., mouse or trackball). In some embodiments, display 1314, I/O device 1316 and cursor control 1318 are optional, or, are used when configuring processor-based system 1300 as a power control unit, and can coupled directly to processor-based system 1300 or via a communication link 1320. In one embodiment, cursor control 1318 can select an input field and input/output device 1316 can include a user input interface, whereby both cursor control 1318 and input device 1316 can collaborate to, for example, program a processor-based system 1300 to operate a power control unit. Note that the term memory can refer to any medium in which data can be stored.

According to some examples, processor-based system 1300 can perform specific operations in which processor 1304 executes one or more sequences of one or more instructions stored in system memory 1306. Such instructions can be read into system memory 1306 from another computer readable medium, such as static storage device 1308 or disk, drive 1310. In some examples, hard-wired circuitry can be used in place of or in combination with software instructions for implementation. In the example shown, system memory 1306 includes modules of executable instructions for implementing an operation system ("O/S") 1332, an application 1336, and data stored as operational profile(s) 1360, fault profile(s) 1362, and fault actions 1363. Application 1336 includes instructions for providing one or more aspects of power control unit functionality. For example, application 1336 includes additional instructions as a waveform control module 1386 to generate configurable power signals and waveforms thereof. Further, application 1336 can implement instructions as mode controller 1388 to control power as function of a mode of operation and as fault detector module 1390 to detect and determine one or more types of faults.

The term "computer readable medium" refers, at least in one embodiment, to any medium that participates in providing instructions to processor 1304 for execution. Such a medium can take many forms, including but not limited to, non-volatile media, volatile media, and transmission media. Non-volatile media includes, for example, optical or magnetic disks, such as disk drive 1310. Volatile media includes dynamic memory, such as system memory 1306. Transmission media includes coaxial cables, copper wire, and fiber optics, including wires that comprise bus 1302. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, an electromagnetic wave that carries a computer readable signal, or any other medium from which a computer or a processor can read or interpret.

In some examples, execution of the sequences of instructions can be performed by a single processor-based system 1300. According to some examples, two or more processor-based systems 1300 coupled by communication link 1320 (e.g., LAN, PSTN, or wireless network) can perform the sequence of instructions in coordination with one another. Processor-based system 1300 can transmit and receive messages, data, and instructions, including program, i.e., application code, through communication link 1320 and communication interface 1312. Received program code can be executed by processor 1304 as it is received, and/or stored in disk drive 1310, or other non-volatile storage for later execution. In one embodiment, system 1300 is implemented as a power controlling device, such as power control unit 1350, that can be located relatively near or at the point of the power sink (or load). But in other embodiments, system 1300 can be implemented as a personal computer (i.e., a desk top computer, personal digital assistance, etc.) or any other computing device.

Figure 14:
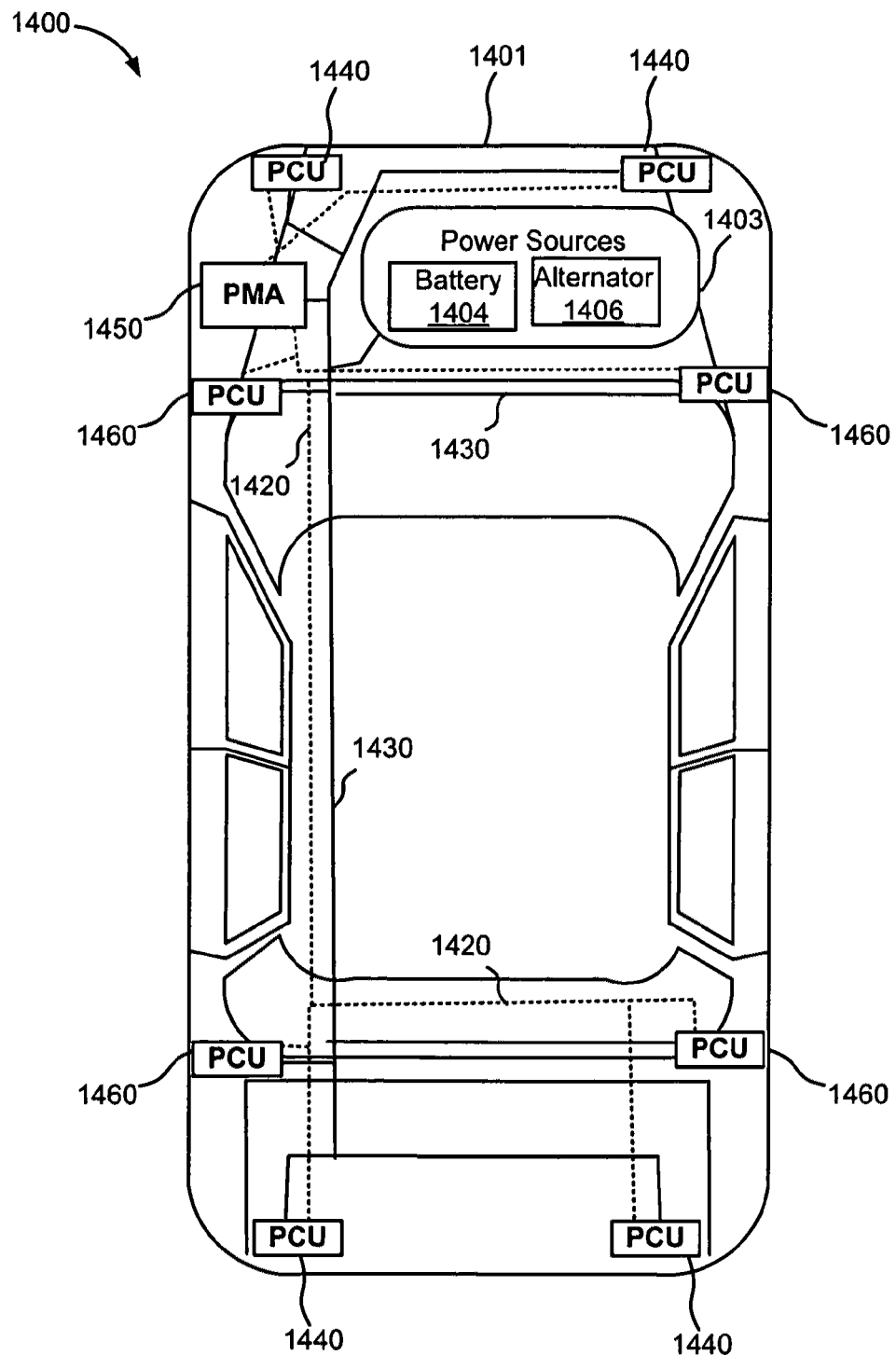
FIG. 14 illustrates an example of power distribution network including a number of PCUs, at least one of which can be configured to control power to and/or from devices that either sources or sinks power, or both, in a motor vehicle, according to various embodiments of the invention.

FIG. 14 illustrates an example of power distribution network 1400 including a number of PCUs, at least one of which can be configured to control power to and/or from devices that either sources or sinks power, or both, in a motor vehicle, according to various embodiments of the invention. In at least some examples, power distribution network 1400 can be disposed in a vehicle, such as automobile 1401. In this example, power distribution network 1400 includes PCUs 1440 configured to power lights (not shown) in the front and the rear, and PCUs 1460 configured to power anti-lock brake systems (not shown) near each wheel. Power distribution network 1400 also includes one or more power sources 1403, which can include a battery 1404, an alternator 1406, and any other power source, such as a fuel cell (not shown), or any power sink, any of which can be coupled to a power bus 1430 to provide power to PCUs 1440 and 1460. Power distribution network 1400 optionally can include PMA 1450 to control operation of PCUs 1440 and 1460 via communications link 1420.

In at least some of the embodiments of the invention, the structures and/or functions of any of the above-described interfaces and panels can be implemented in software, hardware, firmware, circuitry, or a combination thereof. Note that one or more of the structures and constituent elements shown herein, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, FleX™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments related to a vehicle, the discussion is applicable to all power distribution applications such as in distributed generation/microgrid/power plant applications. As such, a vehicle can include a power generation source that can apply power using a power control unit to, for example, a structure, such as a building. Further the power control unit can function to provide power from the building to the vehicle.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A method of controlling the application of power during faults conditions comprising:
   generating a power signal to deliver to a power sink, the power signal having a programmable waveform;
   monitoring a parameter to determine whether the parameter is within a range of parameter values associated with operation of the power sink;
   comparing the parameter against one or more fault profiles;
   detecting a fault as a function of a value for the parameter being noncompliant;
   classifying the fault as being associated with a first subset of faults if the parameter matches a first portion of a fault profile of the one or more fault profiles;
   classifying the fault as being associated with a second subset of faults if the parameter matches a second portion of the fault profile; and
   initiating a fault action.

2. The method of claim 1 further comprising:
   confirming whether the fault is absolute.

3. The method of claim 2 wherein confirming whether the fault is absolute comprises:
   determining that the value for the parameter is associated with a third subset of parameter values.

4. The method of claim 1 wherein classifying the fault as being associated with a first subset of faults comprises:
   confirming whether the fault is mature.

5. The method of claim 4 wherein confirming whether the fault is mature comprises:
   determining that the value for the parameter is associated with a first subset of parameter values; and
   monitoring a first interval of time during which the value for the parameter is associated with the first subset of parameter values.

6. The method of claim 5 further comprising:
   detecting that the first interval of time is equivalent to a threshold indicative of a matured fault.

7. The method of claim 6 further comprising:
   indicating that the fault is mature as a matured fault; and
   implementing the fault action.

8. The method of claim 5 further comprising:
   detecting that the first interval of time does not exceed a threshold indicative of a matured fault.

9. The method of claim 8 further comprising:
   identifying the fault as a nascent fault;
   increasing a degree of maturity for the nascent fault while the value for the parameter is associated with the first subset of parameter values; and
   decreasing the degree of maturity for the nascent fault while the value for the parameter is associated with the second subset of parameter values.

10. The method of claim 9 further comprising:
    indicating that the nascent fault is a mature fault if the degree of maturity meets a threshold degree of maturity.

11. A non-transitory computer-readable storage medium configured to determine faults during application of power, the computer-readable medium comprising executable instructions configured to:
    cause generation of a power signal to deliver to a power sink, the power signal having a programmable waveform;
    monitor a parameter to determine whether the parameter is within a range of parameter values associated with operation of the power sink;
    compare the parameter against one or more fault profiles;
    detect a fault as a function of a value for the parameter being noncompliant;
    classify the fault as being associated with a first subset of faults if the parameter matches a first portion of a fault profile of the one or more fault profiles;
    classify the fault as being associated with a second subset of faults if the parameter matches a second portion of the fault profile; and
    cause initiation of a fault action.

12. The computer-readable storage medium of claim 11 further comprising executable instructions configured to:
    confirm whether the fault is an extreme fault based on a magnitude-based fault type.

13. The computer-readable storage medium of claim 11 wherein the executable instructions to cause initiation of the fault action further comprise executable instructions configured to:
    generate a notification message.

14. The computer-readable storage medium of claim 11 wherein the executable instructions further comprise executable instructions configured to:
    identify the fault as a nascent fault;
    increase a degree of maturity for the nascent fault while the value for the parameter is associated with a first subset of parameter values; and
    decrease the degree of maturity for the nascent fault while the value for the parameter is associated with a second subset of parameter values.

15. The computer-readable storage medium of claim 14 wherein the executable instructions further comprise executable instructions configured to:
    indicate that the nascent fault is a mature fault if the degree of maturity meets a threshold degree of maturity.

16. An apparatus comprising:
    an input terminal configured to receive data from one or more sensors with which to determine a parameter;
    a memory including executable instructions; and
    a processor configured to execute the executable instructions to:
       monitor the parameter to determine whether the parameter is within a range of parameter values associated with operation of a power sink;
       compare the parameter against one or more fault profiles;
       detect a fault as a function of a value for the parameter being noncompliant;
       classify the fault as being associated with a first type of fault if the parameter matches a first portion of a fault profile of the one or more fault profiles;
       classify the fault as being associated with a second type of fault if the parameter matches a second portion of the fault profile;
       cause initiation of a fault action; and
       cause generation of a power signal to deliver to the power sink, the power signal having a programmable waveform.

17. The apparatus of claim 16 wherein the processor is further configured to:
    confirm whether the fault is an extreme fault based on a magnitude-based fault type.

18. The apparatus of claim 16 wherein the processor is further configured to:
    identify the fault as a nascent fault;
    increase a degree of maturity for the nascent fault while the value for the parameter is associated with a first subset of parameter values;
    decrease the degree of maturity for the nascent fault while the value for the parameter is associated with a second subset of parameter values; and indicate that the nascent fault is a mature fault if the degree of maturity meets a threshold degree of maturity.

19. The apparatus of claim 16 wherein the processor is further configured to:
identify that the fault is nascent to form a nascent fault; and
determine whether the nascent fault matures into a subtle fault or dematures such that the fault is extinguished,
wherein the maturation of the nascent fault or the dematuration of the nascent fault is a function of a degree of maturity relative to a threshold degree of maturity.

20. The apparatus of claim 16 wherein the processor further comprises:
a centralized processor.

* * * * *